US008176124B2

(12) United States Patent
Graham et al.

(10) Patent No.: US 8,176,124 B2
(45) Date of Patent: May 8, 2012

(54) COMMUNICATION HUB FOR VIDEO GAME DEVELOPMENT SYSTEMS HAVING A VIDEO GAME DEVELOPMENT TOOL AND VIDEO GAME PLATFORMS WITH COMMUNICATION LIBRARIES

(75) Inventors: Fraser Graham, Salt Lake City, UT (US); Bryce Thomsen, Draper, UT (US)

(73) Assignee: Disney Enterprises, Inc., Burbank, CA (US)

( * ) Notice: Subject to any disclaimer, the term of this patent is extended or adjusted under 35 U.S.C. 154(b) by 588 days.

(21) Appl. No.: 12/328,619

(22) Filed: Dec. 4, 2008

(65) Prior Publication Data

US 2010/0144443 A1    Jun. 10, 2010

(51) Int. Cl.
*G06F 15/173* (2006.01)
*G06F 15/16* (2006.01)
*G06F 15/177* (2006.01)

(52) U.S. Cl. ............ 709/205; 463/42; 725/62; 725/133; 714/46; 709/213

(58) Field of Classification Search .................. 709/205, 709/217–228; 463/42; 725/62, 133; 714/46
See application file for complete search history.

(56) References Cited

U.S. PATENT DOCUMENTS

| 2006/0094504 | A1 | 5/2006 | Polchin | |
|---|---|---|---|---|
| 2006/0258416 | A1 | 11/2006 | Crawford | |
| 2006/0287096 | A1 | 12/2006 | O'Kelley, II et al. | |
| 2006/0287106 | A1* | 12/2006 | Jensen | 463/42 |
| 2007/0265090 | A1* | 11/2007 | Barsness et al. | 463/42 |
| 2008/0004093 | A1* | 1/2008 | Van Luchene et al. | 463/1 |
| 2008/0216125 | A1* | 9/2008 | Li et al. | 725/62 |
| 2009/0070350 | A1* | 3/2009 | Wang | 707/100 |
| 2009/0113251 | A1* | 4/2009 | Goossen et al. | 714/46 |
| 2009/0119737 | A1* | 5/2009 | Perlman et al. | 725/133 |
| 2009/0150423 | A1* | 6/2009 | Spanton et al. | 707/102 |
| 2009/0157811 | A1* | 6/2009 | Bailor et al. | 709/204 |

(Continued)

FOREIGN PATENT DOCUMENTS

WO         03009135 A2     1/2003

(Continued)

OTHER PUBLICATIONS

Partial European Search Report, for Application No. EP09177954, dated Feb. 26, 2010, pp. 1-4.

(Continued)

*Primary Examiner* — Haresh N Patel
(74) *Attorney, Agent, or Firm* — Marsh Fischmann & Breyfogle LLP; Kent A. Lembke

(57) ABSTRACT

A video game development system for enhancing communications between development tools and video game platforms or running games. The system includes a communications hub module running on a computer or server and communicatively linked with first and second video game platforms to allow the communications hub module to forward messages to and receive messages from the game platforms. Memory accessible by the communications hub module stores communication data sets or libraries controlling communications with the game platforms. A video game development tool is provided in the system and is communicatively linked with the communications hub module. The development tool transmits messages formatted based on a client-side communications library defining communications with the hub module. The hub module receives the transmitted messages, generates game platform messages from the received messages based on the platform communication libraries, and forwards the game platform messages to the first and second video game platforms.

9 Claims, 15 Drawing Sheets

U.S. PATENT DOCUMENTS

| | | | |
|---|---|---|---|
| 2009/0164521 A1* | 6/2009 | Lo et al. | 707/104.1 |
| 2009/0198789 A1* | 8/2009 | Young et al. | 709/213 |
| 2009/0307666 A1* | 12/2009 | Kilian et al. | 717/125 |
| 2010/0241507 A1* | 9/2010 | Quinn et al. | 705/14.42 |

FOREIGN PATENT DOCUMENTS

| | | | |
|---|---|---|---|
| WO | 2006055840 A2 | 5/2006 | |
| WO | 2006058485 A1 | 6/2006 | |
| WO | 2006124811 A2 | 11/2006 | |
| WO | 2008091101 A1 | 7/2008 | |

OTHER PUBLICATIONS

Extended European Search report; EP09177954.6-2218, dated May 3, 2010, pp. 1-4.

* cited by examiner

COMMUNICATION HUB FOR VIDEO GAME DEVELOPMENT SYSTEMS HAVING A VIDEO GAME DEVELOPMENT TOOL AND VIDEO GAME PLATFORMS WITH COMMUNICATION LIBRARIES

CROSS-REFERENCE TO RELATED APPLICATIONS

This application is related to U.S. patent application Ser. No. 12/349,601, now co-pending, filed with this application and entitled "Live Authoring Method for Real Time Development of Video Games," U.S. patent application Ser. No. 12/349,633, now co-pending, filed with this application and entitled "Collaborative Authoring Method for Video Game Development," and U.S. patent application Ser. No. 12/349,622, now co-pending, filed with this application and entitled "Real-Time, Video Game Playtesting," all of which are incorporated herein by reference in their entireties.

BACKGROUND OF THE INVENTION

1. Field of the Invention

The present invention relates, in general, to video game development and communications between development tools and video game platforms, and, more particularly, to systems and methods for facilitating and simplifying data transfer and communications within a video game development system or network such as between video game development tools and multiple video game platforms.

2. Relevant Background

The video game market has moved from a smaller niche market to a multi-billion dollar market. The demand for new video games is growing rapidly as the size and demographics of game players continues to expand. Also, video games used to be made for only one or two game platforms, but now there is a demand for video games that can be sold on numerous platforms including standalone game consoles, computers, handheld portable gaming devices, and other electronic devices such as cellphones, digital music players, and personal digital assistants (PDAs). As a result, there is significant competition among game developers to create video games to meet the growing demand in a timely and efficient manner and, often, for these games to be able to run as desired on differing platforms or devices.

Large-scale, commercial video games are typically created by large development teams with the development process taking 1 to 3 years and costing millions of dollars. A typical development team may include producers to oversee production, game designers, artists, programmers, level designers, sound engineers, and testers with some team members handling more than one role. The development team works in a collaborative manner to create game content (or game assets) and game code, which together may be thought of as a game application, that can be run by a gaming engine on a particular game platform to provide the game to a player.

For example, programmers may write new source code, artists may develop game assets such as characters or scene objects, coloring schemes, textures, 3D models of game elements, and the like, sound engineers may develop sound effects and music, writers may create character dialog, and level designers may create advanced and eye-catching levels. To support these team members, numerous game development tools, such as Microsoft XNA, Maya from Autodesk, Inc., and the like, are now available for use in designing and creating game content including creating and modeling characters and even for defining game logic (e.g., how high a character jumps, how much life does a character gain or lose based on a game event, how fast does a character or game element move, and so on). However, typically a complete engine has to be purchased, which causes most game developers to try to build their own tools. Additionally, each video game console or platform developer typically will make a software development kit (or SDK or devkit) available to game developers, and each SDK may include applications or tools that are useful in creating new video games. Each SDK may also include a communications library and/or interface (e.g., platform communications data) to facilitate communications with a game platform (e.g., the platform running a game under current development or running a built game for testing or use by a developer to see how a new character, asset, game parameter, or the like is working in the game).

Currently, development tools used in the video game industry rarely communicate with each other and, if they do, the tools typically communicate and function using a one-to-one connection. Specifically, the tool communicates with a game running on a particular video game platform with a connection between the tool running on a developer's workstation and the game platform. For example, the development tool may generate a platform client on the workstation to provide an interface with the running game, and the tool may be required to manage a communication socket to support these communications. Each game platform typically utilizes differing interfacing and communication protocols (or at least have some differences), and each development tool is required to understand how to communicate with each game platform that may be used with the tool. Presently, a game developer may be working on a video game that needs to operate on more than one game platform, and the development for each platform often occurs along parallel paths as it is desirable (or required) for games to be released concurrently for each of the game platforms.

Hence, there remains a need for improved methods and systems for supporting communications during video game development. Preferably, such methods and systems would support and simplify communications between video game development tools and differing video game platforms.

SUMMARY OF THE INVENTION

The present invention addresses the above problems by providing methods and systems for facilitating and simplifying communications between video game development tools and video game platforms (or games running on such platforms). A central hub communications application is provided that abstracts the knowledge of the video game platforms as well as the existence of other video game development tools. The video game development tools can communicate with any game platform and with each other without requiring specific knowledge of the intended recipients and their communication rules or protocols. To this end, the central hub communications application or module has access to the data or knowledge of how to connect and communicate with each video game platform in a video game development system or network (e.g., has access to platform communication libraries (such as those provided with game platform SDKs or the like) that may be thought of as communication data sets or libraries). In contrast, the video game development tool only has a client-side communications library (e.g., access to such a library in memory of the development workstation or computer or as a library built-in to the tool) that allows the tool to communicate with the communications hub application. The hub application receives the tool-sent messages, processes these messages as necessary based on the video game platform communication data sets, and forwards the messages to the appropriate recipients/clients (e.g., video games running on one or more platforms, to another development tool, or other interested client).

More particularly, a video game development tool is provided for facilitating communications with a first video game platform and a second video game platform (e.g., two or more platforms distributed by two or more companies), with the game platforms providing two different communication libraries defining messaging and other communications with the platforms or games running on such platforms. The system includes a communications hub module running in the system such as on a hub or communications server, and the hub server is communicatively linked with the first and second video game platforms to allow the communications hub module to forward messages to and receive messages from the game platforms. The system also includes memory or data storage that is accessible by the communications hub module and that stores the first and second communication data sets (e.g., first and second or differing code libraries that may be linked into the system). A video game development tool is provided in the system running on a computer system such as a developer workstation or other computing or electronic device. The development tool is communicatively linked with the communications hub module, and, in this regard, the development tool transmits messages configured or formatted based on a client-side communications library that provides information such as communication protocols for communicating with the communications hub module. In operation, the communications hub module receives the transmitted messages from the development tool, generates game platform messages from the received messages based on the appropriate first and second communication data sets, and then forwards the game platform messages to at least one of the first and second video game platforms.

The messages from the video game development tool often will include game data for a video game running on both the first and second video game platforms, and, in these cases, the game platform messages are forwarded to both game platforms from the hub module. The hub module may process each of the messages from the tool to determine or identify a list of recipients for each of the game platform messages it creates. The list of recipients may be based on a set of addressees provided in the tool messages or may be based on the message content (e.g., to recipients interested in particular game data such as particular logic, game assets, game parameters/variable values, and the like). In many cases, the game development system will include additional game development tools linked to the hub module, and these tools may receive messages from the first or original game tool when they are identified in the set of addressees or when placed on the list of recipients by the communications hub module based on the message content (e.g., another tool may be interested when certain game data is modified by another tool). In this way, tool-to-tool communications are facilitated or provided within the development system via the hub module. The list of message recipients may be determined by the hub module from a list of clients that have been registered with the hub module to receive messages from video game tools, and the registered clients may include subsystems of a video game running on one or both of the game platforms. The development tool may use a single communication socket to send the transmitted message to both platforms via the hub module while the hub module may act to provide a communication interface with the game platforms in part by maintaining communication sockets or clients for these game platforms (e.g., to implement the protocols or communication rules/definitions provided in the first and second communication data sets).

DETAILED DESCRIPTION OF THE PREFERRED EMBODIMENTS

Figure 1:
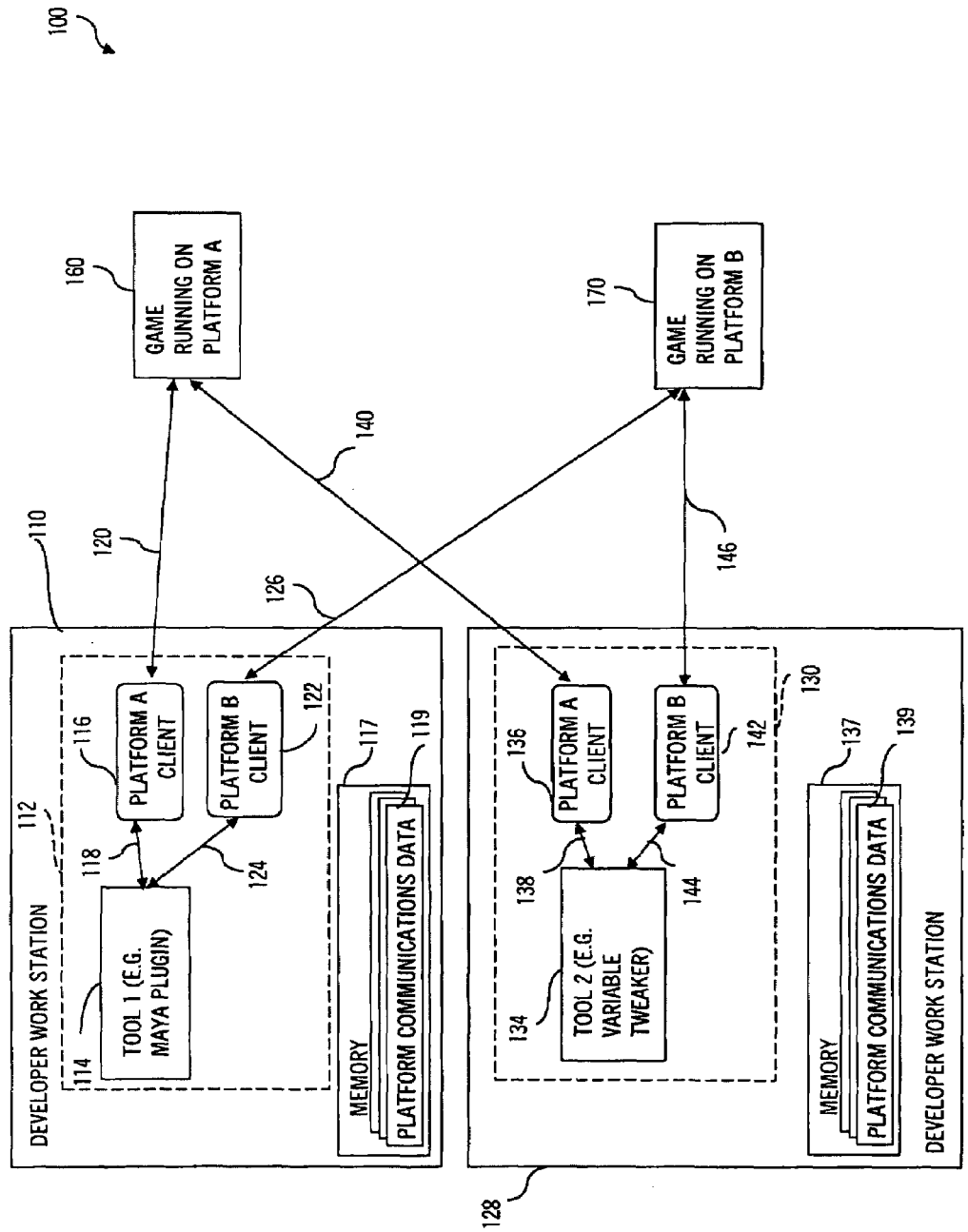
FIG. 1 is a functional block diagram of a video game development system or network configured according to prior communication methods.

Briefly, embodiments of the present invention are directed to methods and systems for managing communications within a video game development system or network. Specifically, a game development system or network is described that lessens the processing overhead, usage complexity, and maintenance requirements for each game development tool used by a game developer by providing a central hub communication application in the development system or network that establishes a communication interface(s) between each tool and differing game platforms. The hub communication application (or the server running such an application) acts as a message passing hub that extracts (or determines) the recipients for a message issued by a development tool and transmits the content (e.g., game data such as modified game logic to be used by a game engine on a platform, a game asset such as a new character or object in 3D model or other form, and/or a game parameter such as lighting level, texturing, and the like) as-is or with reformatting to the recipients in the game development system or network.

As background, the following description provides examples of particular computers, computing devices, workstations, video game platforms/consoles, communication networking and digital connections, memory devices, and other computing hardware and software resources used in video game development. However, it will be understood that these are only representative examples of useful implementations of the invention and not as limitations to its breadth. Further, embodiments of the invention may be thought of generally as a computer-based method for supporting communications, authoring, and testing during game development (e.g., while operating a developer terminal, node, PC, workstation, or the like and using one or more video game development tool), the particular software, firmware, and/or hardware used to implement the described methods and functions are also not limiting of the invention. In general, the algorithms, routines, and processes described herein may be implemented upon nearly any computer-readable medium that can cause a computer or computer system to perform a corresponding function. For example, the hub communication application may be provided as software or programming code for causing a computing device such as a developer's computing device or a central/networked server to perform particular functions as part of creating a game development computing and communication environment and may be stored on a memory device of nearly any node accessible via wired or wireless connections by video game development tools and run on a device that uses one or more processors or CPUs to run the software. The video game development workstations likely will include a number of input/output devices (I/O devices) such as a keyboard, a mouse or trackball or the like, a touchscreen or pad, a voice recognition mechanism, and the like. A monitor or monitors will also be provided to allow the user to view one or more user interface (such as windows created as part of the computing environment to view and/or access video game tool interfaces and view/modify game data such as game logic, game settings, game assets, game parameters, and the like). Such user interfaces may be nearly any combination of menus, screen designs, keyboard commands, command language, and the like (including in some cases mice, touch screens, and other input hardware such as voice recognition) to allow a user to interact with a computer and with video game digital assets and data stored in memory in a particular computing environment. The invention may also be implemented using one or more data servers that may communicate with the workstations over a digital communications network such as the Internet, a local area network, a wide area network, or the like using any of a number of well-known or later developed communications protocols (wired or wireless), and the browsers and related applications may be provided as web applications accessible in particular computing environments.

To assist in understanding some of the benefits of such a hub-based communication system and method as part of the game development and testing process, it may be useful to discuss an existing or more conventional game development system 100 as shown in FIG. 1. In a conventional game development system 100, a number of developers may use workstations 110, 128 to present a computing or working environment 112, 130 in which one or more development tools 114, 134 (such as the Maya Plugin, a Variable Tweaker tool, a logic update tool, and the like) are run so as to develop a video game. This game may be run on a number of differing video game platforms or consoles as shown as platform A and platform B with the running games shown as boxes 160, 170. The computing environment 112, 130 of each workstation 110, 128 may include memory or data storage 117, 137 that is used to store a communication/interface library or platform communications data 119, 139. Such communications data may define all or some subset of the messaging formats and transmittal protocols expected by each video game platform, and, typically, each of the sets of platform communications data 119, 139 defines an at least partially different set of rules that must be followed for the tools 114, 134 to communicate properly with the running games 160, 170 on the platforms. If a developer were working with just one platform, this may not be too much of an issue, but more often each development workstation 110, 128 and running tools 114, 134 are used to develop a game 160, 170 for use on two, three, or more video game platforms. Hence, it is important for the tools 114, 134 to be able to communicate with each platform or game running 160, 170 on such varying platforms (such as those developed and distributed by Sony, Microsoft, Nintendo, and other gaming platform manufactures).

Presently, development tools 114, 134 used in the video game industry typically provide no communications or, if they do provide a form of communication, function as shown by using a one-to-one connection 120, 126, 140, 146 between the tool 114, 134 and the running games/platforms 160, 170. To establish communications, the tools 114, 134 may be thought of as creating communication clients 116, 122, 136, 142 for each game 160, 170 that they wish to communicate with during development/operation of system 100. Further, such one-to-one communications may be thought of as requiring the tools 114, 134 to each create and manage communication sockets 118, 124, 138, 144 to allow direct messaging 120, 126, 140, 146 to and from the running games 160, 170. In the system 100, each tool needs to understand how to communicate with each platform 160, 170 separately. For example, a communication link along with messages formatted as required by the communication data 119 for a particular platform 160 likely cannot be used for sending a message with the same content to the other platform 170. In a more concrete example, a certain tool 114 or 134 may use one set of communication data 119, 139 (e.g., information/data provided in a video game platform developer's SDK or the like) to update objects or other game assets/data on a Sony PS3 platform (or first platform) but could not use these same communication techniques/methods to send messages updating the same objects or other game assets/data on a Microsoft Xbox 360 (or second platform). Further, the one-to-one communication technique has not been useful in allowing tools to communicate between each other or with other tools as the tools 114, 134 generally would need to have explicit knowledge of the other running tools in order to establish a connection.

Figure 2:
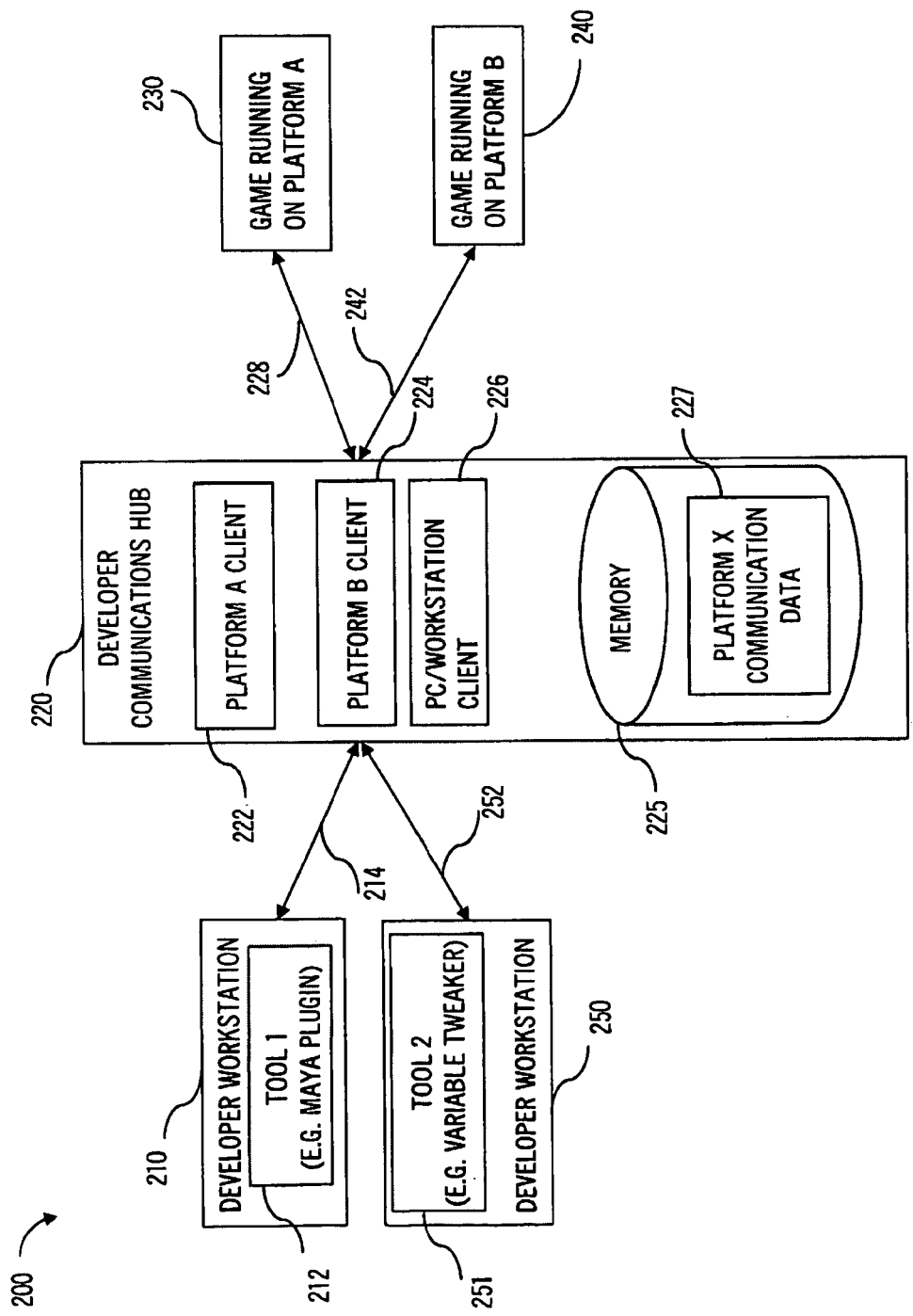
FIG. 2 illustrates a functional block diagram in contrast to the system of FIG. 1 shows a video game development system or network adapted according to an embodiment of the invention with a developer communications hub facilitating communications between game development tools and games running on differing video game platforms and, optionally between the tools themselves.

In contrast, FIG. 2 illustrates a game development system or network 200 that is adapted such that the individual games do not have to have knowledge of the particular platform communications data and/or rules or even what games and/or tools are "listening" or connected to the game network 200. The system 200 again includes a pair of developer workstations 210, 250 that are running video game development tools 212, 251, but only a single connection 214, 252 is maintained/used by each tool 212, 251 to communicate with both games 230, 240 running on two differing platforms and, optionally, with other tools (which is not typically done within the system 100 of FIG. 1).

The system 200 simplifies game development communications by including a developer communications hub 220 (e.g., a server or other computing device that may take the "server" role for messaging within system 200). The hub 220 runs a central hub communications or message-passing application that abstracts the knowledge of platforms and existence of other tools from the individual tools 212, 251, and such a centralization and abstraction of communications duties allows the tools 212, 251 to communicate with each other and with any game platform 230, 240 without requiring specific knowledge of the intended recipient and potential interfacing, message formatting, and other communication requirements imposed by that recipient. The system 200 does this generally by centralizing the knowledge of how to connect with different platforms 230, 240 into a central hub application and, in some cases, by building a client side communications library into each tool (not shown but used to allow the tools 212, 251 to communicate with the hub application with a relatively simple messaging protocol that can be used for all of its messaging and data transfer in system 200). Such a library may also be used to allow the platforms 230, 240 to connect with the hub 220 (or hub communication application running thereon).

As shown, the hub 220 provides an interface to a client 222 for tools 212, 251 to communicate with games running on a first platform 230 (shown as Platform A) as well as communication clients 224, 226 for tools 212, 251 to communicate with games running on a second platform 240 (shown as Platform B in FIG. 2). The hub 220 includes memory or data storage 225 for storing communications data or libraries 227 (such as those provided in video game SDKs and the like) for each of the platforms 230, 240. The information is used by the hub application running on hub 220 to provide the interfaces between the tools 212, 251 that send the hub-formatted messages over links 214, 252 and games 230, 240 running on differing platforms and linked to hub 220 via links 228, 242.

The communications may be managed, in part, by the hub application creating communications clients 222, 224, 226 based on the platform communications data 227 in memory 225. During operation of system 200, a tool 212 or 251 transmits a message over link 214 or 252 (such as a message to modify a lighting setting or a texturing of an object of the game or so on) that is formatted per the client-side hub library (not shown in FIG. 2). The hub 220 acts to determine which recipients should receive the message content such as one or both of the games on the two platforms 230, 240 and tool 212 or 251. The hub 220 then uses the appropriate communications data/libraries 227 to reformat/translate the message for each recipient (and/or uses the created clients 222, 224, 226 to manage such communications and comply with communication rules). The hub 220 then forwards the message to the interested or determined set of recipients in the system 200. As can be seen from the relatively general illustration of system 200, the tools 212, 251 and games 230, 240 need only know how to talk or communicate with the hub 220, and there is no need for specific knowledge of the communication rules of the intended recipient(s) to send game information or data out onto the network or system 200 and to the recipient(s). In contrast to the system 100 of FIG. 1, the tools 212, 251 do not need to manage communication clients and/or sockets for each possible platform or store/access communications data/libraries for each game platform. Further, the system 200 allows the tools 212, 251 to communicate with each other (as is explained in more detail below).

Figure 3:
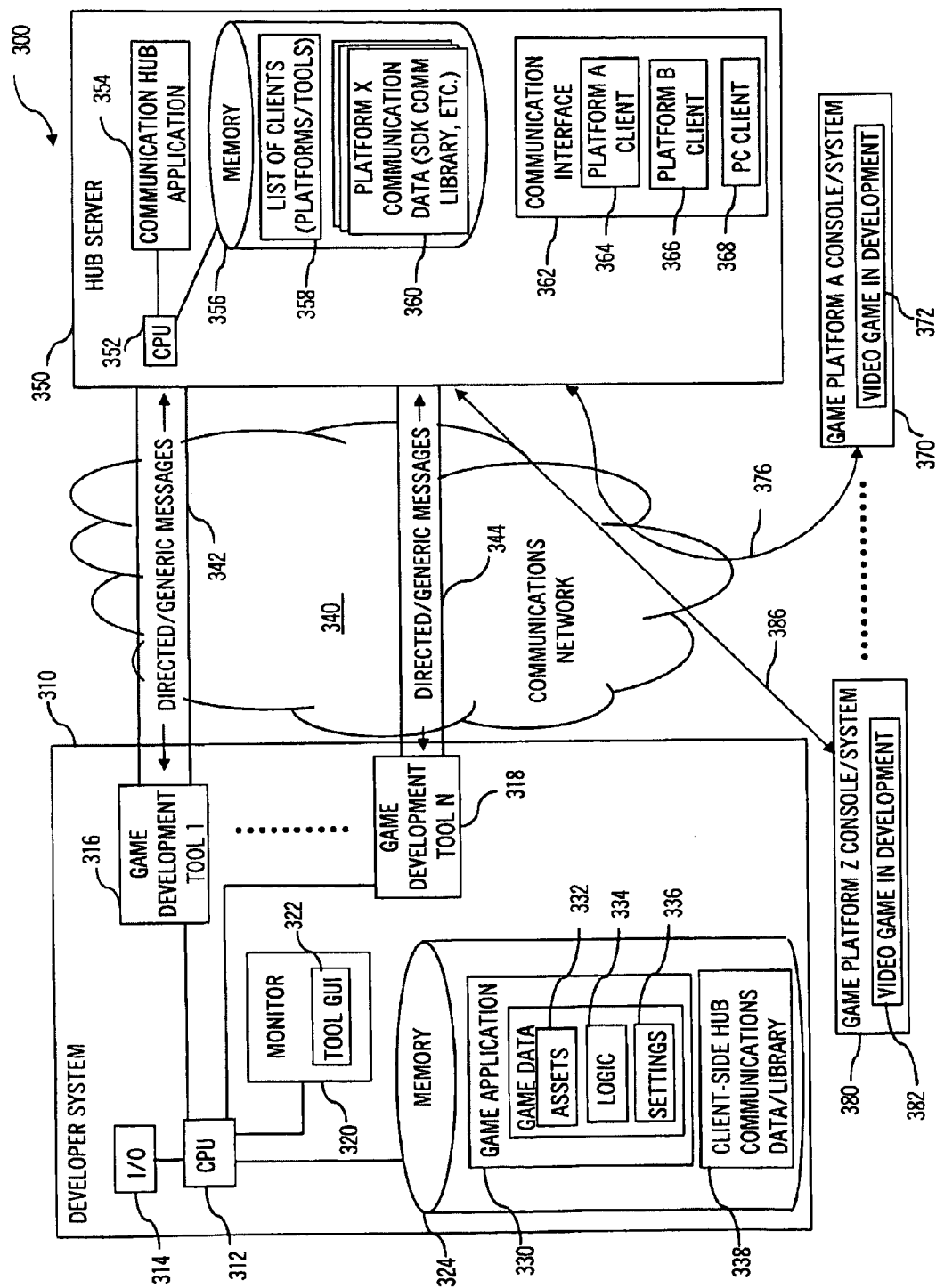
FIG. 3 illustrates a functional block diagram of video game development system or network providing additional detail of an exemplary implementation or embodiment illustrating that games use a client-side communication library (that may be built into each tool) to create or use a single communication socket to transmit and receive game data or development messages from the central hub application.

FIG. 3 illustrates in more detail a video game development system 300 that may be used to implement the communication methods of an embodiment of the invention. In this embodiment, a developer computing system 310 is shown that includes a CPU 312 running two or more video game development tools 316, 318 such as those used to create 3D models, to set or adjust game logic, to create objects, characters, or other game assets, and so on. I/O devices 314 may be provided to allow a developer to interact with the tools 316, 318 and game data, and one or more monitors 320 are included to view tool GUIs 322 and otherwise view/interact with tools 316, 318 and game data. The system 310 further includes memory 324 that stores client-side hub communications data/library 338, and this includes data to enable the tools 316, 318 to communicate with the communication hub application 354 (and through this application 354 with games under development 372, 382 or other ones of the tools 316, 318 (or tools on other systems 310 not shown). The memory 324 is also shown to include a game application 330 such as a game being developed or a recent build of such a game (or this data may be stored on another memory device accessible by system 310 and other developer systems). The game application 330 includes game data such as game assets 332, game logic 334, and game settings 336, and the game application 330 can be thought of as being defined by this game data; hence, game development includes using the tools 316, 318 to create and modify the game data in memory 324 and/or on a running game 372, 382 on a number of video game platforms/consoles 370, 380.

The system 300 also a communications network 340 that is used to connect the developer system 310 with a hub server 350. The hub server 350 includes a CPU 352 that runs a communications hub application 354. The CPU 352 also manages memory 356 that is shown to store a list of clients 358 (e.g., platforms, tools, games or subsystems of games registered with the hub application, and the like) for receiving system communications. The memory 356 also stores platform communication data 360 (e.g., SDK communication libraries for each platform 370, 380) for each platform 370, 380 in the system 300 or expected to be added to/used within system 300. The hub server 350 runs the communication hub application 354, and the application 354 may function to provide a communication interface 362 between the tools 316, 318 and the game platforms 370, 380 (and between tools 316, 318 themselves). To this end, a communication client 364, 366, 368 may be created by the hub application 354 using the platform communication data sets 360 for each platform 370, 380 as well as rules/protocols for communicating with the workstation/system 310.

During operation of the system 300, each of the game development tools 316, 318 may use the client-side hub library 338 as a built-in or runtime communication mechanism to create and manage a hub communication socket or link 342, 344 via network 340 to send messages to and from the hub application 354 on server 350. These messages may include game data such as modifying game logic 334 or an asset 332 on games 372, 382 (e.g., the same game running on two differing platforms). The hub application 354 processes these messages via interface 362 and clients 364, 366, 368 and/or communication data 360 to determine the recipients for the message, to place the message in the expected format for those recipients, and to transmit the message over links 376, 386, 342, 344 as appropriate. The list of clients 358 may include the video games 372, 382 or one of the tools 318 and each message may be sent to one, a set of, or all of such recipients depending on the content (who is registered as being interested in that type of content/message) and/or on a recipient list/addressee in the message from the tool 316, 318 (such as to a particular game or game subsystem or to any tools interested in a particular game data).

Figure 4:
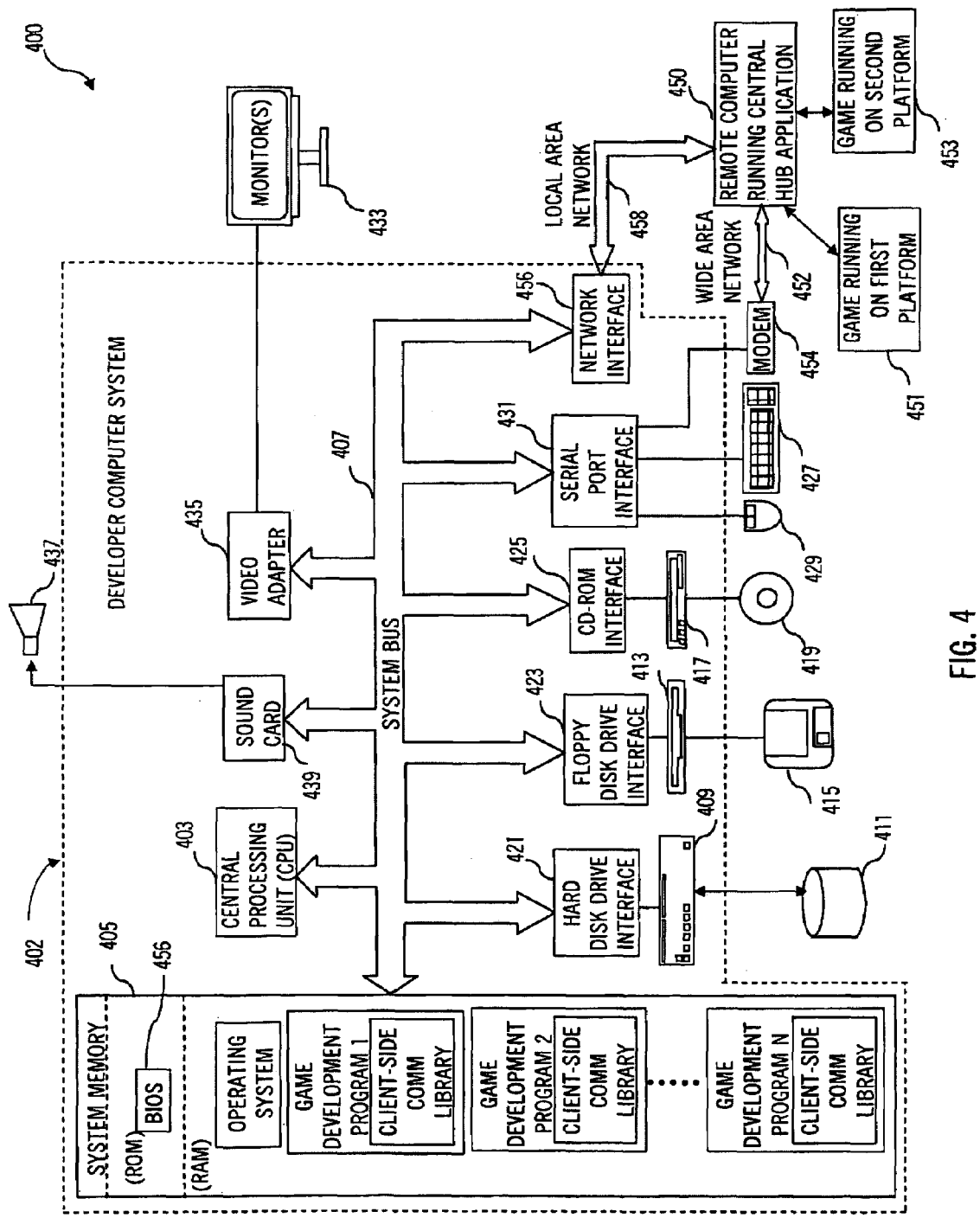
FIG. 4 illustrates a development system or network illustrating in more detail one exemplary computer system useful for implementing the communication methods, authoring methods, testing methods, and other functionality described herein.

FIG. 4 generally illustrates a game development system or network 400 that may be used to implement the hub or centralize communication techniques and other functions/processes described herein. The network 400 includes a computer system 402, which typically is used by a game developer (or member of a video game development team) and includes a processing unit or CPU 203 and system memory 205 with one or more game development tools that may be run by CPU 203. As discussed above, each of the game development tools or programs may have a built-in client-side communications library that provides the information required for the program to communicate with a central communication hub application running on a remote computer 250 (or on one of the developer computer systems 402 in a distributed system/network), and, in this manner, messages generated by the game development programs can be relatively simple and/or generic in form and be delivered via the central communication hub application to games running on first and second (or more) platforms 451, 453 that may have differing communication requirements (e.g., differing message configuration/content, differing transmission protocols, differing communication and/or client interfaces, and the like such as may be specified by each platform developer's SDK or a communication library in the SDK or otherwise specified).

A system bus 407 couples various system components including system memory 405 to processing unit 403. System bus 407 may be any of several types of bus structures including a memory bus or memory controller, a peripheral bus, and a local bus using any of a variety of bus architectures. System memory 405 includes read only memory (ROM) and random access memory (RAM). A basic input/output system (BIOS) 456, containing the basic routines that help to transfer information between elements within computer system 402, such as during start-up, is stored in ROM 456. Computer system 402 further includes various drives and associated computer-readable media. A hard disk drive 409 reads from and writes to a (typically fixed) magnetic hard disk 411; a magnetic disk drive 413 reads from and writes to a removable "floppy" or other magnetic disk 415; and an optical disk drive 417 reads from and, in some configurations, writes to a removable optical disk 419 such as a CD ROM or other optical media, and, of course, other removable memory devices may be inserted into and accessed (read and/or writing of data) via a port such as a USB or other communication port in a housing of the system 402. Hard disk drive 409, magnetic disk drive 413, and optical disk drive 417 are connected to system bus 407 by a hard disk drive interface 421, a magnetic disk drive interface 423, and an optical drive interface 425, respectively. The drives and their associated computer-readable media provide nonvolatile storage of computer-readable instructions, programs, procedures, routines, data structures, program modules, and other data for computer system 402 (such as initial installation of the client-side communications library and/or for backup storage/transfer of game application or game assets). In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules such as game development tools, testing routines, and the like may be stored on hard disk 411, removable magnetic disk 415, optical disk 419 and/or ROM and/or RAM of system memory 405. Such program modules may include an operating system providing graphics and sound APIs, one or more application programs, other program modules, and program data such as game data A user may enter commands and information into computer system 402 through input devices such as a keyboard 427 and a pointing device or mouse 429. Other input devices may include a microphone, a joystick, a game controller, wireless communication devices, a scanner, or the like. These and other input devices are often connected to processing unit 403 through a serial port interface 431 that is coupled to system bus 407, but may be connected by other interfaces, such as a parallel port interface or a universal serial bus (USB) or by wireless connections. A monitor(s) 433 or other type of display device is also connected to system bus 407 via an interface, such as a video adapter 435 such as for viewing game development and game testing GUIs or other game data.

Computer system 402 may also include a modem 454 or other means for establishing communications over wide area network 452, such as the Internet. Modem 454, which may be internal or external, is connected to system bus 407 via serial port interface 431 (or some other interface). A network interface 456 may also be provided for allowing computer system 402 to communicate (e.g., establish communication sockets and the like) with a remote computing device or server 450 via a local area network 458 (or such communication may be via wide area network 452 or other communications path such as dial-up or other communications means). Computer system 402 typically includes other peripheral output devices, such as printers and other standard devices (not shown). Computer system 402 is preferably equipped with an operating system supporting Internet communication protocols and/or other digital communications network protocols and communication interfaces (e.g., to support digital communications with the central communications hub on computer 250 via messages generated and transmitted based on the definitions/ requirements of the client-side communication library typically built into the game development programs). Other types of computer systems other than or in addition to the one shown are usable to practice the invention (e.g., a local area network of computers, an interactive television, a personal digital assistant, an interactive wireless communications device, electronic devices with adequate computing capabilities and memory, or the like).

Figure 5:
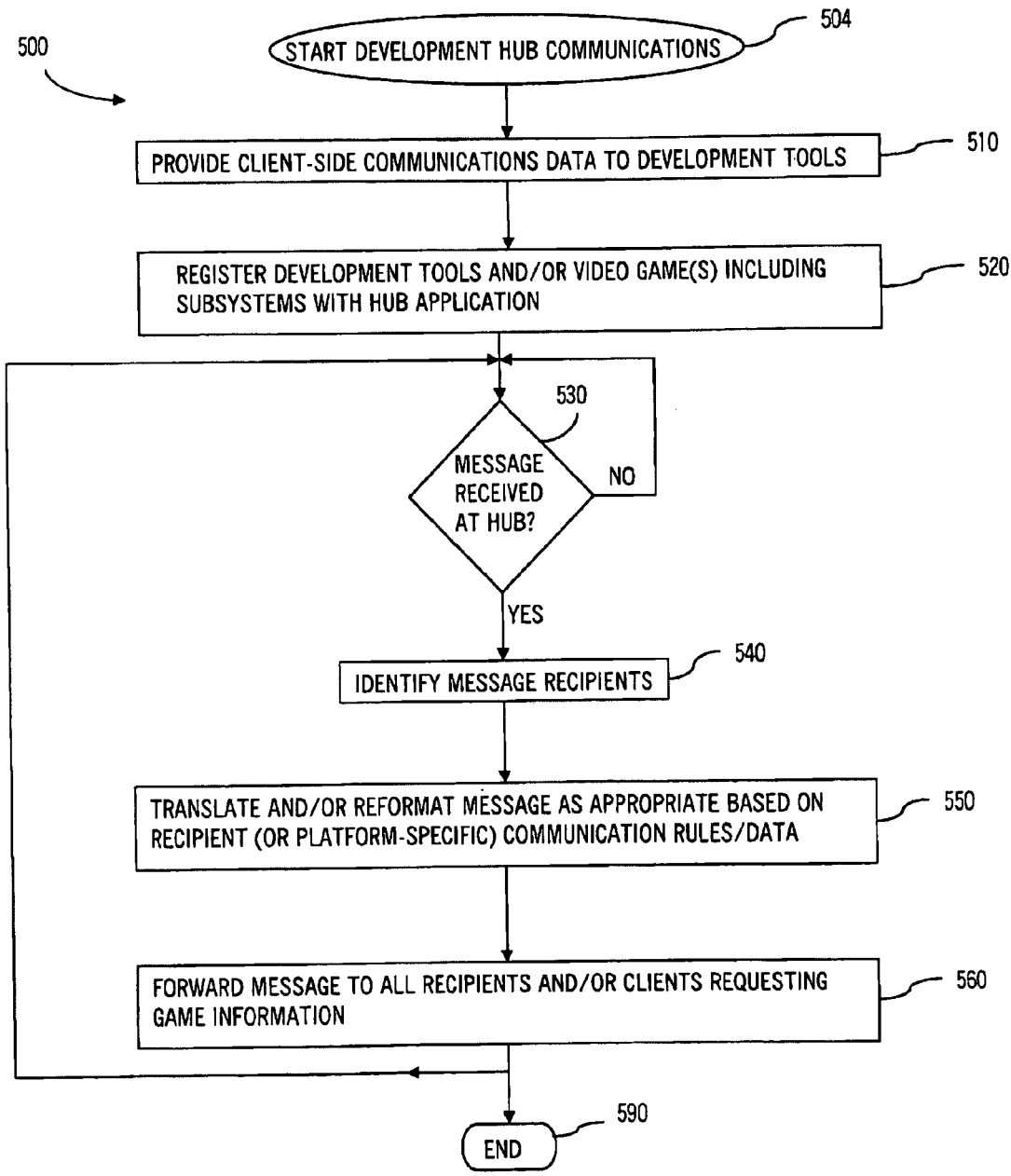
FIG. 5 is flow chart illustrating generally a game development or hub-based communication method of an embodiment of the invention.

FIG. 5 illustrates a video game development communications method 500, as may be implemented by the systems 200, 300, 400 of FIGS. 2-4. At 504, the method 500 starts by loading or providing a central hub application within a video game development system or network. The communications data or libraries for each game platform or console that is being used or may later be connected to the network may be made available to the central hub application. At 510, the method 500 continues with providing client-side communications data or a hub library to each of the development tools (or to the workstations that run such tools). The client side library may be a runtime library stored in the workstation memory. The client-side libraries include the data or information (such as messaging configuration/format and/or other communications protocols) to allow the tools to communicate with central hub application. At 520, the method 500 continues with registering development tools and/or video game(s) with the hub application to create a recipient list for the development network or system. Tools may register to be informed when particular game data is altered while the video games typically are registered in a subsystem manner to receiving communications/messages from tools including modified game data (e.g., a materials subsystem, an objects subsystem(s), a texturing subsystem, a lighting subsystem, and so on may each register with the hub application for a particular video game running upon a game platform linked to the development system or network). This aspect of the system allows tools to direct messages to a particular subsystem instead of relying on the game to determine the appropriate subsystem itself.

The method 500 then may include the hub application monitoring the communication network for a next message to be transmitted from a tool or game. When a message is received at the hub, the method 500 continues at 540 with the hub application acting to identify message recipients 540. For example, in some embodiments, the tools may transmit messages in a generic manner with no addressees specified, and in such cases the message may be sent to all recipients on the hub recipient list or a subset interested in a particular type of message or message content. In other cases, the message may be transmitted by the tool in a form that specifies one or more (a set) of recipients for the message, e.g., a message to a game running on one platform or another tool. At 550, the hub application translates and/or reformats the message as appropriate based on the identified recipients and the communications data (rules, libraries, and the like) associated with each of these identified recipients. For example, a hub-formatted message from a tool may be reformatted or translated to comply with communications data/rules for a first game platform and also for a second game platform. Then at 560, the method 500 continues with the hub application forwarding the message to all identified recipients or to clients requesting the game information in the message. In some cases, the hub application handles opening communication links or sockets for each platform (and/or for each recipient or the like). The method 500 may continue at 530 with waiting for additional game development or related messages or end at 590. Generally, the method 500 may be used for one-to-one communications as a tool or other sender of the development network may specify the recipient or addressee, but the method 500 also supports a one-to-many connection or broadcasting communication methods as a tool can make a change to a particular game data (such as tweak a portion of the game logic) and transmit a generic hub-format message that will be sent by the hub application to all interested recipients (e.g., to all games or game subsystems affected by the change). As a result, a developer does not have to create and send a message for each platform to have the change implemented by running games.

Figure 6:
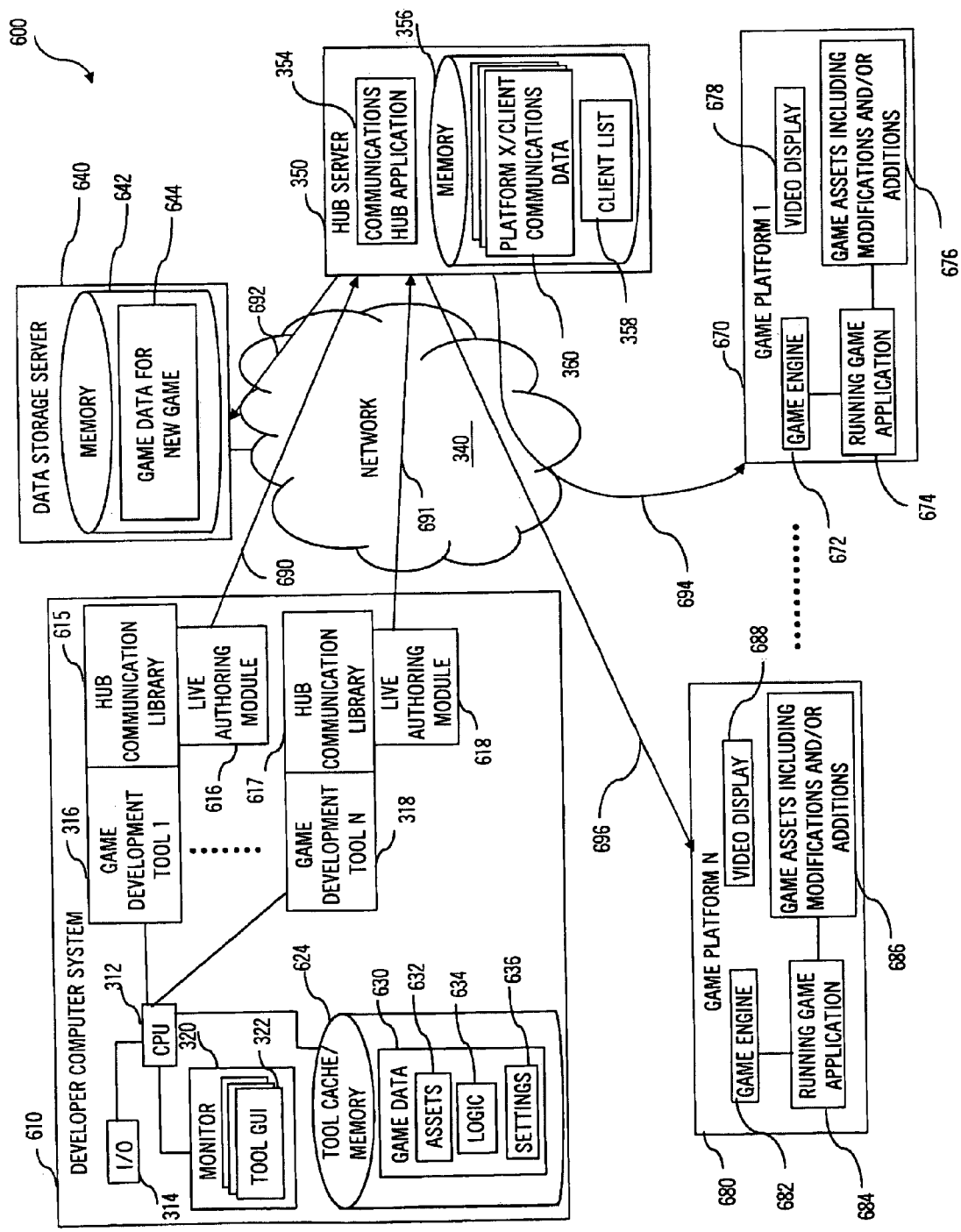
FIG. 6 is a functional block diagram of a game development system or network according to an embodiment of the invention showing use of a live authoring module along with a communications hub application to facilitate tool-to-game communications and to support live, real time authoring of video games.

FIG. 6 illustrates a game development system 600 adapted particularly for supporting live authoring of video games on two or more different game platforms or consoles (e.g., Microsoft's Xbox, Sony's Playstation consoles, Nintendo's Garnecube or Wii, and the like). The system 600 includes a number of components similar to those discussed in detail with the system 300 of FIG. 3 with like numbers being used for those components and the description of FIG. 3 is applicable to FIG. 6. For example, the system 600 includes a hub server 350 running a communications hub application 354 that functions to receive messages 690, 691 from game development tools 316, 318 running on computer 610. These messages 690, 691 are formatted according to a hub communication library 615, 617 shown as a built-in library for tools 316, 318, and the hub application 354 acts to process the messages to determine a set recipients specified in the message or, more typically, from content of the messages 690, 691 and from comparison to a client list 358 of interested listening clients (e.g., other tools 316, 318, games 674, 684, or storage management components for the centrally located/stored game data 644). The received messages 690, 691 are then reformatted/translated for each recipient based on communications data 360 for that recipient (e.g., what format does platform 670 expect/require? and so on) and forwarded to those recipients via the network 340 (or via a direct connection (not shown)).

Likewise, the developer computer system 610 is similar to system 310 in that it includes a CPU 312, I/O devices 314, and a monitor 320 for displaying information including game data in tool GUIs 322. The system 610 also uses the CPU 312 to run one or more game development tools 316. In this case, each tool 316, 318 is able to link to and communicate with the communications hub application 354 using a built-in, client side library 615, 617 that defines how to interface and communicate with the hub application 354 including how to format authoring messages 690, 691. In the system 600, a data storage server 640 is included that is accessible by the tools 316, 318 via network 340 and includes memory 642 storing the game application data 644 (e.g., game assets such as created objects, character models and animation, game logic, parameter/variable settings, and other information used by a game engine in running a video game). As game tools 316, 318 access the data 644 (e.g., display current values in a tool GUI or the like), a tool cache or memory 624 may be used by CPU 312 to store game data 630 such as game assets 632, game logic 634, and variable/parameter settings 636 for efficient access by tools 316, 318.

During operation of the developer computer system 610, a developer may call up or use a number of game development tools 316, 318. For example, a logic adjustment tool 316 or 318 may be used that provides a GUI 322 that presents the present game logic 634 or settings 636 and allows it to be readily adjusted or tweaked (e.g., how fast a character runs, how much high a character jumps, how many times an opponent has to be struck to fall, and so on) such as with pull down boxes with logic value choices, slide bars to adjust values, data entry boxes, and the like. Another tool 316, 318 may be used to create a new animation or to modify an existing model or object such as by changing its texture, by moving its position within a screen, modifying its size, and so on via a GUI 322 displayed on monitor 320.

According to one important aspect of the system 600, the developer is able to obtain instantaneous or real time feedback on these changes in previously built and running video games on two or more differing game platforms (e.g., on Sony's PS3 concurrently with Nintendo's Wii consoles and so on). As shown, the system 600 includes at least two game platforms 670, 680 that include game engines 672, 682 to run game applications 674, 684. The running video games 674, 684 functionality is controlled in part by the game assets 676, 686 such as 3D models of characters and other animations, level design, game play logic, lighting settings, textures, coloring, and so on. When the video game 674, 684 is run by the engines 672, 682 a video display 678, 688 of the platform or game system 670, 680 is used to display the game to players such as testers and, in this case, to the developers.

To provide real time feedback, the developer computer system 610 includes live authoring modules 616, 618 associated with or built in to each development tool 316, 318. The live authoring module 616, 618 functions (as is discussed with reference to FIG. 7) to cause (or facilitate) changes or additions to the game data 630 for a video game to be broadcast as shown with authoring messages 690, 691 from the tools 316, 318 through the hub application 354 to a list of recipients or interested clients 358 of the hub server 350. The authoring messages 690, 691 are formatted according to client-side hub communications libraries 615, 617 for receipt by the hub application 354 while the hub application 354 uses platform/client communications data 360 to translate each of the messages it sends out over network 340 (or directly) to a list of recipients. The recipients for the reformatted (when necessary) authoring messages 690, 691 may be running game applications 674, 684 and other ones of the game development tools 316, 318. This allows a developer to implement a change in the game assets such as to make a change to a character skin or clothing with one tool 316 (such as Adobe Photoshop) and have that change broadcast via authoring message 690 for distribution in proper platform/recipient form by communications hub application 354, and the developer or use of system 610 will see the results of the change in both running games 674, 684 as the game assets 676, 686 are updated based on received game data update messages 694, 696 transmitted by the hub application 354. Additionally, the change may be broadcast to the other game development tool 318 (such as Autodesk Maya) with another update message (not shown) from hub application 354. A game data update message 692 may also be sent from the hub application 354 to a data or central storage server 640 to cause the game data for the new game 644 to be updated to reflect the changes made with tool 316.

In this manner, a single authoring message 690 or 691 from a tool 316, 318 may be used to cause multiple changes to be concurrently implemented within any number of game platforms 670, 680 as well as other tools 316, 318, and this can be achieved without the developer having to have knowledge of each platform 670, 680, without creating and sending multiple messages, and without having to reprocess or create new builds of the running game applications 674, 684 as the authoring is "live" or performed with real time feedback. Rebuilds of games, in contrast, are undesirable as they may take several minutes to complete.

Figure 7:
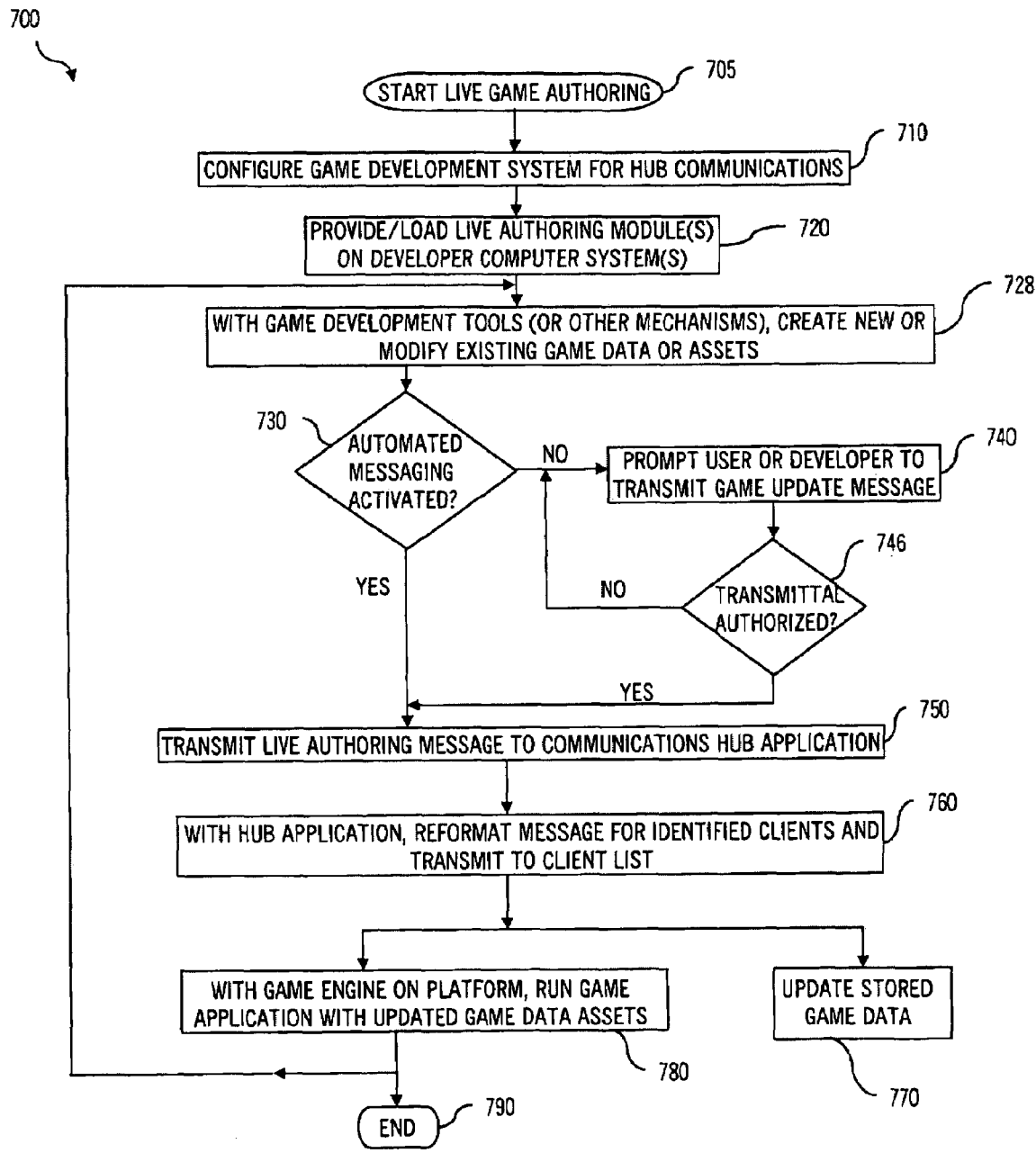
FIG. 7 is a flow chart of a live authoring process of an embodiment of the invention such as may be implemented by operation of the system of FIG. 6.

FIG. 7 illustrates a live video game authoring method 700 of an embodiment of the invention such as may be implemented by operation of the system 600 of FIG. 6. The method 700 starts at 706 such as by choosing a number of video game development tools for use in creating a new video game, loading such tools onto a workstation (or making the tools available from a server in a network or distributed computing environment). The video game may be designed for use on more than one video game platform, and at 705 this set of video game platforms or consoles will be selected or defined. As discussed above, modifications to game logic, objects, textures, lighting, coloring, and other game assets/data may be processed by a game engine of each platform differently such that it is desirable for a developer to be able to view the results of changes to a running game in real time on the various platforms (e.g., with the displays of the platforms positioned side-by-side or nearby to allow ready comparisons of displayed games).

At 710, the method 700 continues with configuring the game development system for hub communications, e.g., for allowing a tool to send a single message in a format understood by the hub application that can then determine a recipient list, translate/reformat the message based on the communication requirements of each recipient, and broadcast/forward the authoring or game data update message to the set of recipients. To this end, client-side libraries may be provided on the game developer's computer or workstation such as modules built in or accessed by each game tool to allow the tools to communicate with properly formatted messages to the hub application, and hub application is provided in the system and communicatively linked to the tools (such as via a communication network). The hub application is provided access to communications libraries or data sets (e.g., communications libraries provided with a game platform SDK and the like to manage communications with clients associated with a potential recipient list within the developer system, which may include other development tools (e.g., a PC client may be utilized/supported by the hub application) as well as game data central storage.

At 720, the method 700 continues with providing and/or loading a live authoring module or modules on the developer computer system(s). For example, a single authoring module may be provided to support a set of development tools or an instance may be provided for each development tool to support communications with the hub application upon changes to the game data with a tool. At 728, the method 700 continues with a developer using the game development tools (or other mechanisms) to create new game assets or to modify existing game data or assets (such as changing the logic to make a particular move or portion of a game easier or harder).

At 730, the method 700 includes determining whether automated messaging has been activated within the live authoring module. For example, it may be a default setting for the live authoring module for authoring messages to be broadcast automatically upon a game development tool linked to an authoring module being used to create or update a game asset or game data In other embodiments, the game developer may be given the option of making such messaging automatic or to select an option in which they are prompted by the authoring module after making a change with a tool to send an authoring message to the running video games (and other interested clients/recipients) via the central communication hub. In this regard, if the messaging is not automated (e.g., handled by the authoring module without further action by the developer), the method 700 continues at 740 with the live authoring tool prompting the user or developer to transmit a game update message such as by displaying a message in workstation monitor or tool GUI asking if the updated data should be sent in an authoring message or whether to remind the developer later (e.g., upon another asset addition or modification). At 746, the method 700 includes determining whether the message transmittal is authorized. If not, the method 700 may continue at 740 as shown or return to step 728 (e.g., await a next change to a game asset). In other embodiments/implementations, the data is always sent if possible and typically always handled. In such cases, the method 700 is adapted to from prompting a user, especially when they may end up skipping one change and then allowing a second change, which is dependent upon the first, which may cause problems.

If messaging is automated or has been authorized, the method 700 continues at 750 with the live authoring module acting to transmit the authoring message to the communications hub application. The authoring message is in a format called for by the hub application (e.g., in a client-side library), and the message content typically is the game data addition (e.g., a new object or character) or a change to an existing game asset such as to modify game logic, change a variable or parameter setting or position, and so on. At 760, the hub application receives the message, determines a set of recipients or clients to receive the message, translates each based on a corresponding communications data set defining/controlling communications with that recipient, and transmits or forwards the messages with game data to each identified recipient.

At 770, the game data for the video game may be updated to reflect the game data in the authoring message (e.g., in centralized storage location accessible by one or more developers working on one or more workstations). At 780, the method 700 continues with the game engine running the game application with the updated game data or assets as presented in the authoring message broadcast from the development tool. The method 700 may end at 790 or return to step 728 to allow the developer(s) to make additional revisions or additions of the game data. In this manner, the developer can author a change or set of changes to a video game, broadcast a single authoring message with one, two, three, or more additions and/or changes to the game data or assets, and view the resulting effects these changes/additions have on the running game application within one, two, or more game platforms or consoles.

Figure 8A:
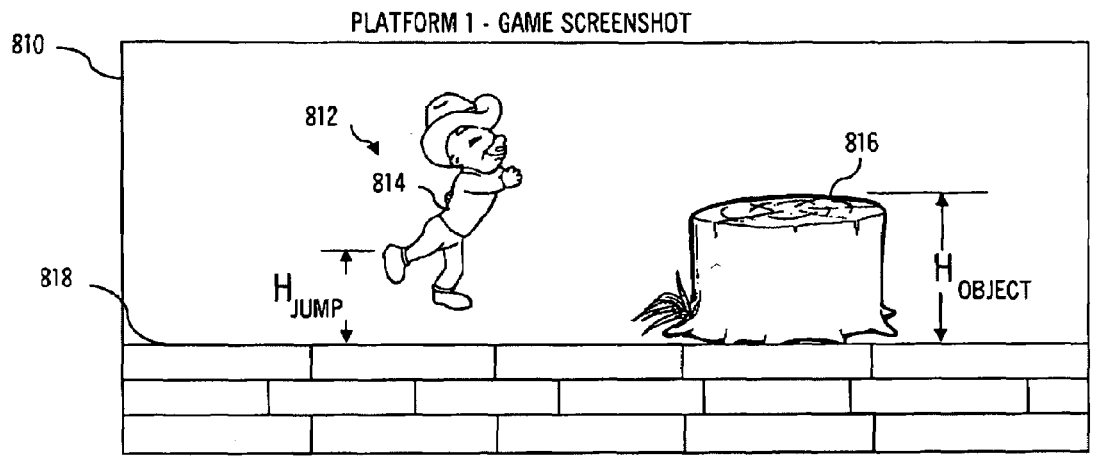
FIGS. 8A and 8B illustrate screenshots from display devices of two game platforms or consoles running the same video game being developed by authoring methods described herein.
Figure 8B:
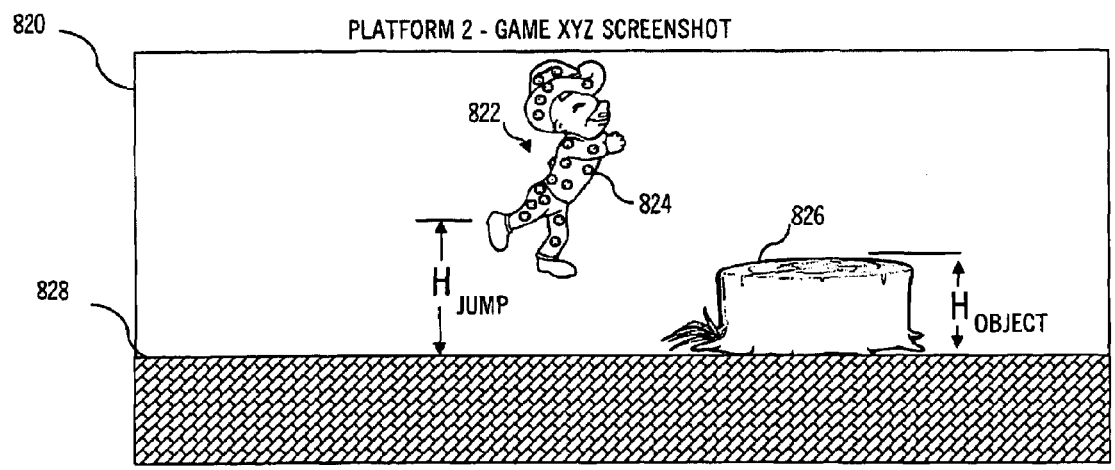

FIGS. 8A and 8B illustrate screen shots 810, 820 of a video game that may be running upon two differing game platforms such as by two differing companies' game consoles. Often, it is preferable to create a single set of game data for a video game rather than creating a separate set for each game platform, and while a game application running on two differing platforms may appear nearly identical when displayed on the consoles' monitors there typically are at least minor differences in the display. In some cases, a change to a game asset such as a lighting level or texture of a scene element may have a desirable appearance on one platform while having an appearance or resulting effect that is undesirable on a second platform. Additionally, different pre-processing steps may be employed that take source data to engine ready. These steps can be run as part of the send to the hub or, in some cases, by another tool listening for updates going through the hub that would intercept, process, and re-send data.

For example, the game data or assets used by a game application and/or game engine running the game application may be identical for the screen shots 810, 820. As shown, a game character 812 with clothing 814 is shown to be jumping from the floor/ground 818 toward the top of a game object (e.g., a column in this case) 816. The character 812 is shown to jump to a particular height, $H_{jump}$, while the object 816 has a particular height, $H_{object}$. In screen shot 820 corresponding to a different game platform, the character 822 is shown to have clothes 824, and the clothes 824 may have a different appearance than clothes 814. Similarly, the game shot 820 shows the floor 828 with a texture similar to that of floor 818 but with some small differences. Yet further, an object 826 is included but its height, $H_{object}$, differs from that of object 816 and/or the height of the jump, $H_{jump}$, may differ for the character 822. From this illustration, it can be seen that a set of game data may be processed differently or produce differing results for a game application run on two differing platforms. This makes it desirable for a developer to view a running game while (e.g., "live") they make changes to the game data or assets and, preferably, to view the same game running on two or more platforms to allow a determination of whether the change or addition to the game assets is desirable or effective.

Figure 9A:
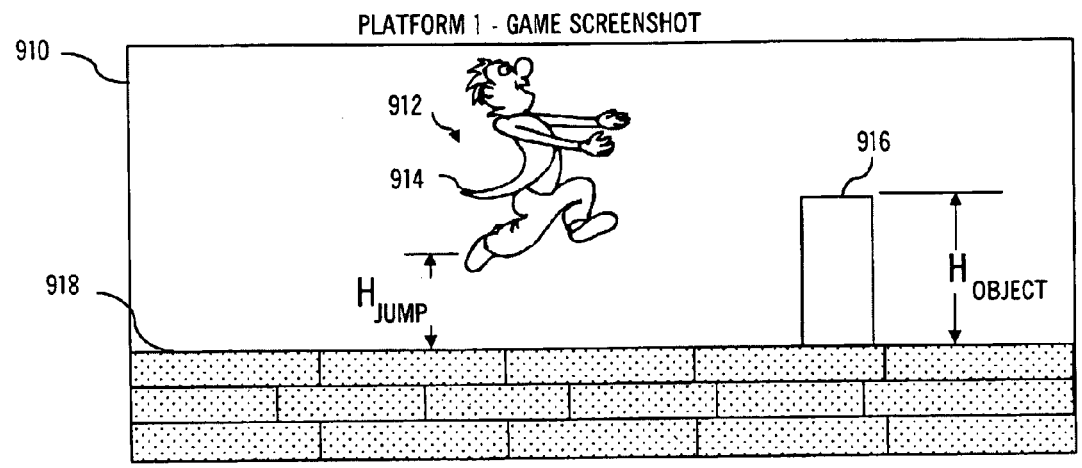
FIGS. 9A and 9B illustrates screens shots from display devices of two different game platforms running similar to FIGS. 8A and 8B after live authoring is used to update a set of game data or assets, which shows real time display of changes to a game by operation of one or more game tools and how such changes are implemented uniquely by two platforms.
Figure 9B:
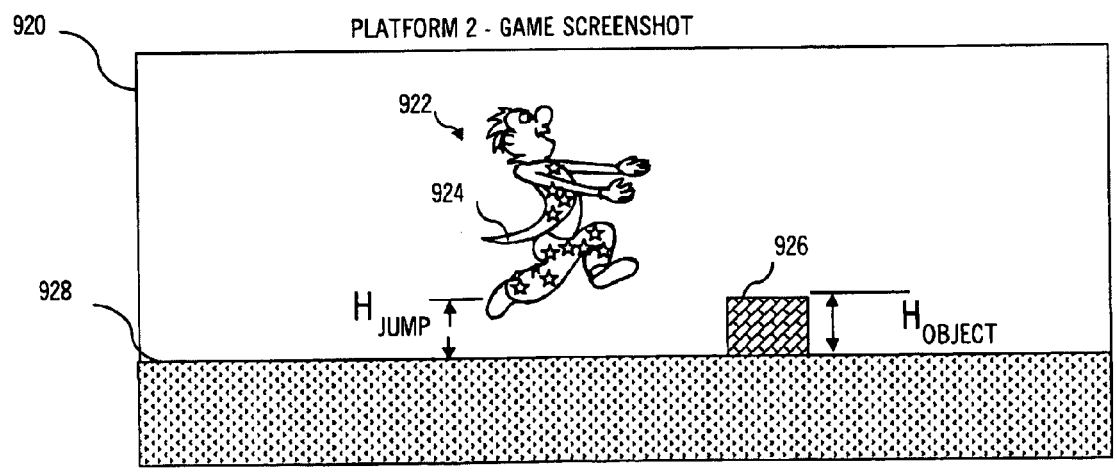

FIGS. 9A and 9B show screen shots 910, 920 of the video game at the same location/position in the game and for the same two platforms but after several changes have been made to the game data. The change may be implemented with live authoring techniques described herein such as by changing several game assets and then issuing a live authoring messages with the changed content. In some embodiments, a single change or addition may be made with each message while other embodiments may have a developer performing several changes and sending all changes within a single authoring message. In the illustrated example, a developer has used game development tools to make several changes to the game data The game logic has been modified such that the height of the jump, $H_{jump}$, of the character 912, 922 in response to a player input is greater. The object 916, 926 has also been modified by reducing its height, $H_{object}$. Further, the texture of the flooring/ground 918, 928 has been modified.

The modified game assets/data is used by the two game engines/platforms associated with screen shots 910, 920 but, as is shown, the changes to the game data results in at least partially differing results or effects for the game display or game output. For example, the texturing of the floor 918, 928 may appear somewhat different, the height the character jumps may be slightly different, and/or the height of the object 916, 926 may differ for the two platforms with the same game data. Of course, not every game data change or addition will result in a different game effect for differing platforms, but it is very useful for a developer to be able to verify the effects of their editing or authoring in real time (or nearly instantaneously as the game display is modified based on changes) and for the effects to be verified/tested for all platforms for which the game is being designed. The live authoring tool with use of the communications hub application technology allows live authoring to be carried out in a game development system with efficient messaging and without requiring iterative steps of creating new builds of a game on every platform (e.g., a useful portion of the live authoring processes is that builds of multiple games running on differing platforms receive game data changes concurrently with the tool or developer workstation sending message(s) to the communications hub). Also, as discussed, multiple content/logic changes can be sent/made in real time, which significantly increases the efficiency of a developer making numerous edits/changes to a video game.

In some game development environments, it is desirable for two or more game development tools to communicate with the same live instance of a video game on one or more video game platforms. For example, it may be useful for a developer to use two tools concurrently to work on a video game including changing differing portions of the game data (e.g., level design and game assets such as texturing, lighting settings, game logic, and so on). In other examples, two game developers may wish to work on the same portion or location within a video game concurrently with the same or differing game development tools. In some embodiments, a game development system configured as discussed above (e.g., see FIGS. 2-4 and 6 and the like) with a hub application may be used to allow content (or game data) changes performed or made by separate individuals (e.g., development team members) to be reflected in the same game simultaneously (or at least without requiring the game instance to be stopped, one set of changes made, rebuild the game, and then allow a next developer to work on the game). In some cases, the developers' respective tools may listen to communications (e.g., register as clients with the hub or the like) and update their game data on the client end (e.g., on the separate workstations) in real time or on an ongoing/live manner. As a more specific example, a texture artist using Adobe Photoshop (or another game development tool) may be working simultaneously or at least partially concurrently with a world designer using Autodesk Maya (or another game development tool), and as the texture artist tweaks or updates the texture, the change may be reflected in a running game instance on a set of video game platforms and also in the world designer's view or tool GUI of Maya. Additionally, the world designer may be changing or tweaking game data such as object positions and the changes they are making may reference the same texture being adjusted or authored by the other developer. Such collaborative authoring with real or near real time feedback on a running game instance and game tool GUI had previously been unavailable in the one-to-one (tool to game) connections used by game developers.

Figure 10:
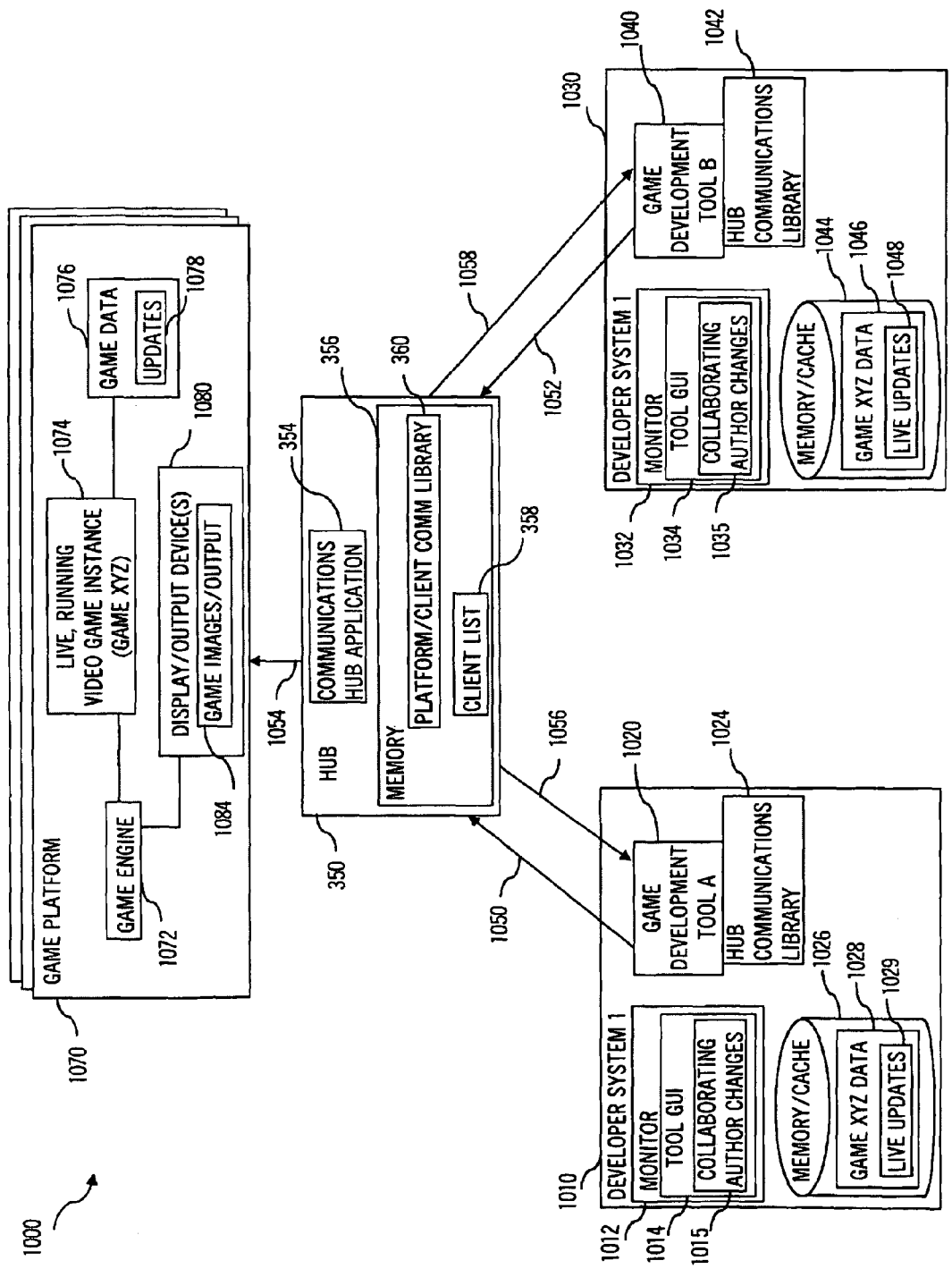
FIG. 10 illustrates a functional block diagram of a game development system (e.g., a simplified version of the systems of FIGS. 2-4 and 6 and components not shown in FIG. 10 may be included in the system of FIG. 10) adapted for collaborative authoring of a video game.

FIG. 10 illustrates a video game development system 1000 adapted for supporting collaborative authoring methods and functions. Note, the system 1000 is shown in a somewhat simplified manner to highlight portions that may be used in collaborative authoring but the system 1000 may include any of the components and software devices discussed herein such as shown in FIGS. 2-4 and 6. To support collaborative authoring of a video game, the system 1000 includes a set of developer systems 1010, 1030 that may be operated by the same or, more typically, different authors or game developers. A monitor 1012, 1032 is provided on each system 1010, 1030 along with one or more game development tools 1020, 1040. The game development tools 1020, 1040 are communicatively linked with a hub 350, which runs a communications hub application 354 as described throughout this description, and the hub application 354 uses platform and other client communication libraries or rule sets 360 and registered client lists 358 to support communications between the tools 1020, 1040 and a live, running video game instance 1074 as well as with other tools 1020, 1040 on the same or differing computers.

During operation of the system 1000, the game development tools 1020, 1040 access centralized game data storage (not shown in FIG. 10) and store game data 1028, 1046 in memory or cache 1026, 1044. The tools 1020, 1024 use the monitors 1012, 1032 to display a tool GUI (or tool interface) 1014, 1034 that includes or is created based upon game data 1028, 1046. Concurrent with operation of the tools 1020, 1040, the system 1000 includes one or more game platforms 1070 that use a game engine 1072 to run an instance 1074 of the video game being worked on by the tools 1020, 1040, with the instance 1074 being run based on the present game data 1076 including any updates or changes 1078 generated by use of the tools 1020, 1040. The game engine 1072 may use or support use of one or more display and/or output devices 1080 to provide the game output 1084 (e.g., video images, sounds, music, dialog, and/or other audio output, controller tactile feedback, and the like defined or provided by the running game instance 1074).

In this exemplary embodiment 1000, a hub communications library or data set 1024, 1042 is provided for each tool 1020, 1040 and is used by the tools 1020, 1040 to transmit or broadcast authoring messages 1050, 1052 to the hum 350.

The communications hub application 354 then determines recipients, translates the messages 1050, 1052 (which are in a format expected/required by the hub application 354) to a form expected/required by each identified recipient, and then transmits a set of game data update messages 1054, 1056, 1058. In the collaborative mode of operation, the client list 358 may include the tools 1020, 1040 (e.g., each tool 1020, 1040 listens for changes to the game data 1028, 1046 it uses/references). The authoring messages 1050, 1052 are transmitted generally after the tools 1020, 1040 are used to create updates 1029, 1048 to the game data 1028, 1046. These changes/content are included by the hub application 354 in the data update messages 1054, 1056, 1058 such that the game data 1076 used by the live, running video game instance 1074 includes or is provided based on the game data updates 1078. As a result, the game images/output 1084 provided by the platform output devices 1080 is "live" or provides real time feedback after the authoring messages 1050 and/or 1052 are transmitted.

Significantly, the messages 1050, 1052 may be transmitted independently or in an overlapping manner to support collaborative authoring as a user of development system 1010 or 1030 may continue work with tool 1020 and 1040 to author or modify the game 1074. In other words, "concurrent" and/or collaborative authoring is generally intended to mean that two or more tools 1020, 1040 may work on a single game instance 1074 (or instances running on two or more platforms 1070) and communicate changes or updates with each other and/or with the running game (e.g., to have real time or live feedback regarding the changes provided by operation of the game platform 1070 and in their tool GUIs 1014, 1034). The updates 1029, 1048 made by one or both of the tools 1020, 1040 are also reflected in the tool's game data 1028, 1046 such that work by each developer is provided in a timely manner to each developer, and the tool GUI 1014, 1034 may include the updates 1029, 1048 such as shown with collaborating author changes 1015, 1035 (e.g., changes made by the other one of the authors and not just with the tool 1020 or 1040 associated directly with the tool GUI 1014, 1034).

Figure 11A:
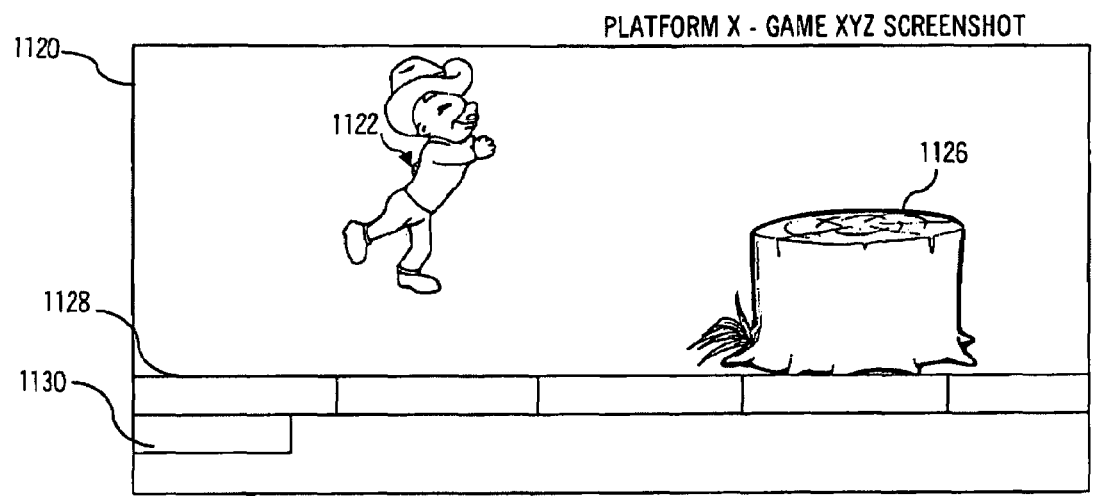
FIGS. 11A and 11B illustrate video game platform screenshots illustrating live authoring of a running game and also show authoring/development being performed in a collaborative way with two development tools (and/or with two authors/developers operating such tools in some examples while in others a single author may work two or more tools in a self-collaborative manner)
Figure 11B:
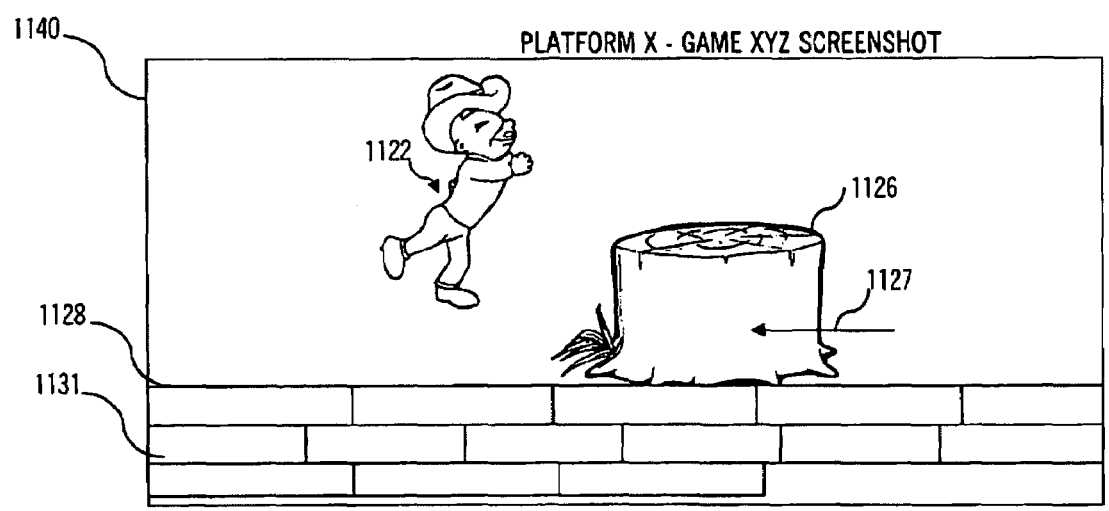

FIGS. 11A and 11B illustrate screenshots 1120, 1140 that may be provided during operation of the system 1000 of FIG. 10. As shown in FIG. 11A, a game platform 1070 may be running an instance of a game 1074 and with a first set of game data 1076 may create the output 1084 shown in screenshot 1120 on the platform monitor 1080. In the screenshot 1120, a character 1122 is shown jumping from scene element/object 1128 (e.g., a floor, the ground, or the like) toward or onto another game object 1126 (e.g., a platform, a column, or the like). As shown, the column or game object 1126 has a particular position in the game level or scene, and the floor or game object 1128 has a texture 1130 (which is shown to be at a first stage of development/completion).

As shown in FIG. 11B, the game platform 1070 may continue to run the instance of the game 1074 but with a set of game data 1076 that has been updated with game data changes/modifications 1078. In this example, the updates 1078 have been provided by two tools 1020, 1040 with one tool being used for texturing the floor 1128 while the other is being used to adjust object positions. Hence, as shown in FIG. 11B, the screenshot 1140 shows the floor 1128 at a later stage of development/completion for the texture 1131 (or, in some cases, the texture/material 1131 may be a newly created and applied texture/material). Also, the screenshot 1140 shows the column or game object 1126 being moved as shown with arrow 1127 to a new position relative to the character 1122 (e.g., to make a jump or other move easier or harder). Numerous other changes may be made by allowing two or more tools

1020, 1040 to access a live instance of a game 1074 and to provide updates 1078 to the game data 1076. Also, the changes 1078 (such as the modification of the texture 1130 to 1131) may be transmitted to the other tool 1020, 1040 and reflected (when appropriate) in the tool GUI 1014, 1034 such as when the tool interface includes a representation of a game object whose texture or other characteristics have changed as result of game updates performed by another tool.

The hub communications applications and tool-to-game platform communication techniques described herein may also be utilized to provide unique and effective playtesting of video games. The playtesting described below may be thought of as "real-time" in that collected data from the game is transmitted via the communications hub to a playtesting monitoring system (or developers workstation/computer) and presented as the playtesting is occurring (e.g., with no or minor delays) on one or more monitors. Real-time playtesting turns what used to be a static game testing environment into a dynamic, interactive process. Interactivity is provided by the use of development tools or other devices to transmit game modifications (e.g., changing logic to make a function or process easier or harder or the like) via the communications hub to the game platforms (which may be differing types of platforms requiring differing communication protocols for messaging) where the game engine running the video game application uses the modified game data to nearly instantaneous provide a revised game to the game players (e.g., all of the games may be modified in a like manner or a subset may be modified to determine if the change has a desired or predicted effect).

In some preferred embodiments, the video game testing system is adapted such that the game play data is monitored in real time rather than evaluating the results of a given testing session after the fact (e.g., days or weeks after the test group has left the test facility). Data is collected from each game player or individual tester and reported back to a centralized location such as a monitoring computer system or a developer's workstation adapted for playtest monitoring. From this central location or system, changes can be made by the developer such as by operating a video game development tool to transmit authoring messages with new game data/content to via the communications hub application to one or more of the running video games (e.g., a game mod recipient set). The results of this game modification or change can be determined nearly immediately because the game players or individual testers are still in the test facility and play the revised running game or instance of the game on one or more game platforms. For example, if a significant portion such as a majority of the game players are having difficulty completing a given jump (or other game task/function), the level designers or other development team members can "on the fly" or in near real time shorten the distance to see if this modification to the running game helps increase the success rate to a desired level (e.g., still some amount miss the jump if desirable to provide a challenge at this point in the game). A statistics gathering tool may be run to store the change to game data and when in the test that the change was made such that the game modification or "tweak" is tracked and stored along with other playtest tracking data.

The game modification may be made on all game platforms or in all running game instances or for some smaller fraction or subset (e.g., 50 percent, 10 percent, 80 percent or the like), and the players may be grouped based on one or more criteria and the subset selected out of one or more of these groups (e.g., modify 30 percent of the running games for the highest skill level players, modify 70 percent of the running games for the players under 30 years old, modify 40 percent of the running games for the male players, or nearly any other combination of fraction of the games and grouping of players). The use of real-time monitoring of playtesting combined with modifying the game in a single play session ensures that the playtesters or test group of players is of a consistent skill level, which in the past had led to wide ranges of results as the skill of two groups of players often varied widely. The communications hub application allows any number of game clients to connect and send nearly any type of game play information or data through the hub to a statistics gathering and processing tool(s) for real-time processing/evaluation and display to monitoring individuals (e.g., members of the development team). One or more authoring or game development tools can connect to the same communications hub application and distribute tweaks or modifications to the game data to some or all of the playtesters during the playtest.

Figure 12:
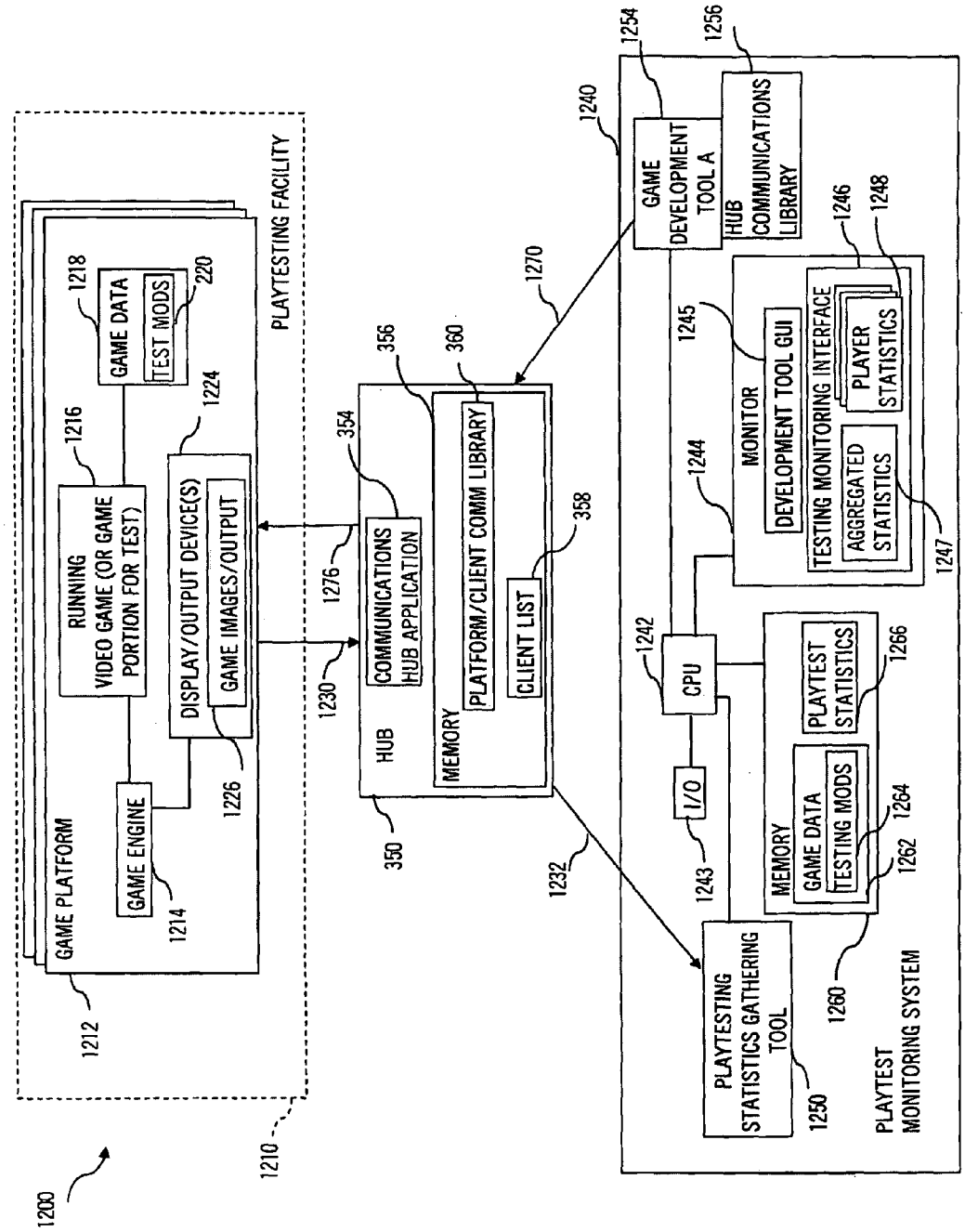
FIG. 12 is a functional block diagram of a video game testing and development system (e.g., that may include at least some of the components from FIGS. 2-4, 6, and 10) showing use of a communications hub application and play-testing statistics gathering tool to facilitate testing of a video game including obtaining real time feedback from a set of players or testers for modifications to the game data or tested portion of the video game.

FIG. 12 illustrates a video game playtesting system 1200 of an embodiment of the invention that is adapted for providing developers with real-time feedback of test results and also for allowing these developers to make changes to the running video games while the same control group is available to play the game. As shown, the system 1200 includes a playtesting facility 1210 in which a plurality of game platforms 1212 are provided, and, as discussed above, these may be the same platform or may vary to allow the same game to be tested on a variety of consoles/systems. Each platform 1212 includes a game engine 1214 to run a video game application 1216 (or a portion that is ready for testing) based on a set of game data 1218, which typically will be in an initial testing state and then will include test modifications or changes 1220 as discussed below to tweak or change some game feature (such as amount of life or energy lost at being struck by an opponent or the like) after gathering and processing a quantity (e.g., a half hour, an hour, a number of attempts or repeats of a level or game portion, or the like) of test or play data. A display and/or output device 1224 is provided as part of the platform 1212 and operates during game play or testing to provide game images and other output such as audio and tactile feedback output.

As the game 1216 is played by a set of testers, game play data 1230 is transmitted to the hub server 350 that includes a communications hub application 354 that communicates (as discussed in detail above) using client communications libraries 360 and client lists 358 stored in memory with the game platforms 1212 and with a playtest monitoring system 1240. In particular, the hub application 354 forwards the game play data 1230 to the playtest monitoring system 1240 in a form accepted/expected by the monitoring system 1240 (or client applications running thereon such as the statistics gathering tool 1250 and game development tool(s) 1254) as testing data messages 1232.

The monitoring system 1240 often will be operated by a game developer or development team member to tweak or fine tune aspects of a video game 1216 during or as part of performing playtesting at the facility 1210. To this end, the system 1240 includes I/O devices 1243 managed by a CPU 1242 to allow an operator to input or select game changes or test modifications 1264 via interaction with a game development tool 1254 and/or to view and manipulate results of game testing. A monitor 1244 is provided that may be used by a playtesting statistics gathering tool 1250 to display a test monitoring interface 1246, e.g., to display aggregated playtest information to the developer. The monitor 1244 may also be used by the game development tool 1254 to display a development tool GUI 1245 to display the game data 1262 that is presently being used by the game (shown at 1218) and is being tested and to allow the developer to make changes or tweaks to the game logic or other game assets/settings (e.g., shorten a jump, increase life/energy of a character upon reaching a check point, and so on). In other embodiments, a separate tool is utilized that is not necessarily part of the monitor 1244.

As discussed above, the development tool 1254 may use a built in (or accessible) hub communications library 1256 to communicate with the hub application 354 with game authoring messages 1270 that typically will include testing mods or game data changes 1264 made via the tool 1254 and interface 1245. The hub application 354 determines the appropriate clients and sends test modification messages 1276 to the clients or game applications 1216 on various platforms 1212 in the facility 1212 (or to other development tools as discussed above). The clients receiving the modification messages 1276 may then modify their game data 1218 to include the modifications 1220 and the running video game 1216 will reflect the changes to allow the testing by the same control group to continue to verify the effectiveness or usefulness of the changes. The games 1216 receiving the changes 1220 may be all of the running games 1216 or some smaller subset selected by an operator of the monitoring system 1240 such as a fraction of all games or a fraction of a subgroup of the games and so on.

The playtesting statistics gathering tool 1250 may function to record all the received data 1266 in memory 1260, but, typically, the tool 1250 also is configured to perform aggregation functions and to present processed/aggregated data 1247 within an interface 1246. For example, the gathering tool 1250 may act to generate and store 1266 and then display aggregated statistics 1247 such as numbers of players, average scoring/energy at various game checkpoints, number of players beating a level or challenge and how many attempts it requires, and so on. This aggregation of statistics by tool 1250 is preferably done on an ongoing basis concurrently with the operation of the playtesting facility 1210 such that developers have real-time feedback on the results of the playtesting of the game 1216. The statistics gathering tool 1250 may also display player statistics for each of the players as shown at 1248 in interface 1246. The individual player stats 1248 may include demographic information such as age and sex as well as other more gaming specific information such as number of years of gaming experience and skill ranking (if available, while the system 1200 is useful in some aspects not because of knowledge of the skill levels but because the control group is the same before and after a test mod 1220 is sent to and implemented in a running game 1216).

Figure 13:
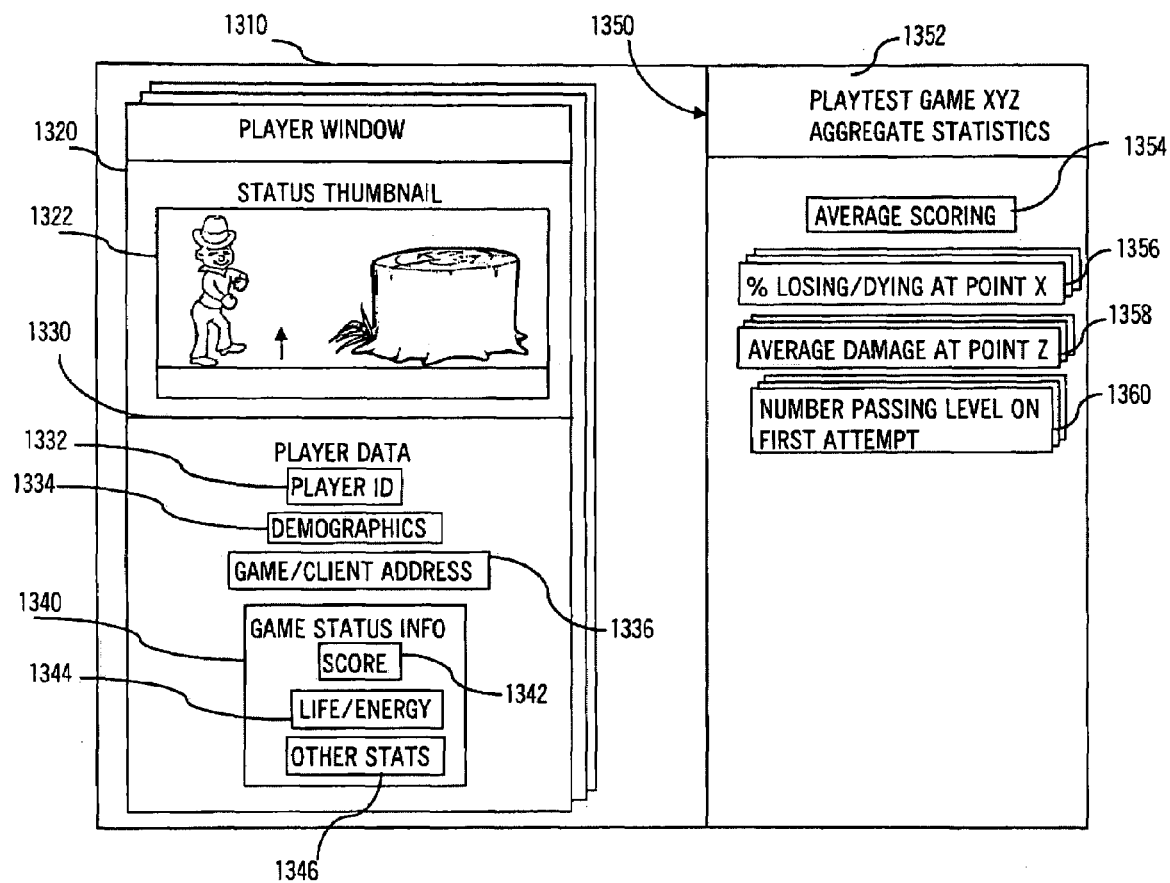
FIGS. 13 and 14 illustrate screenshots of test monitoring interfaces that may be provided by the playtesting statistics gathering tool or other devices of the system of FIG. 12 to allow a user such as a game developer to access game test data in real time or "live" and also to view aggregated and/or processed data for the group of players or testers in a real time or live environment.
Figure 14:
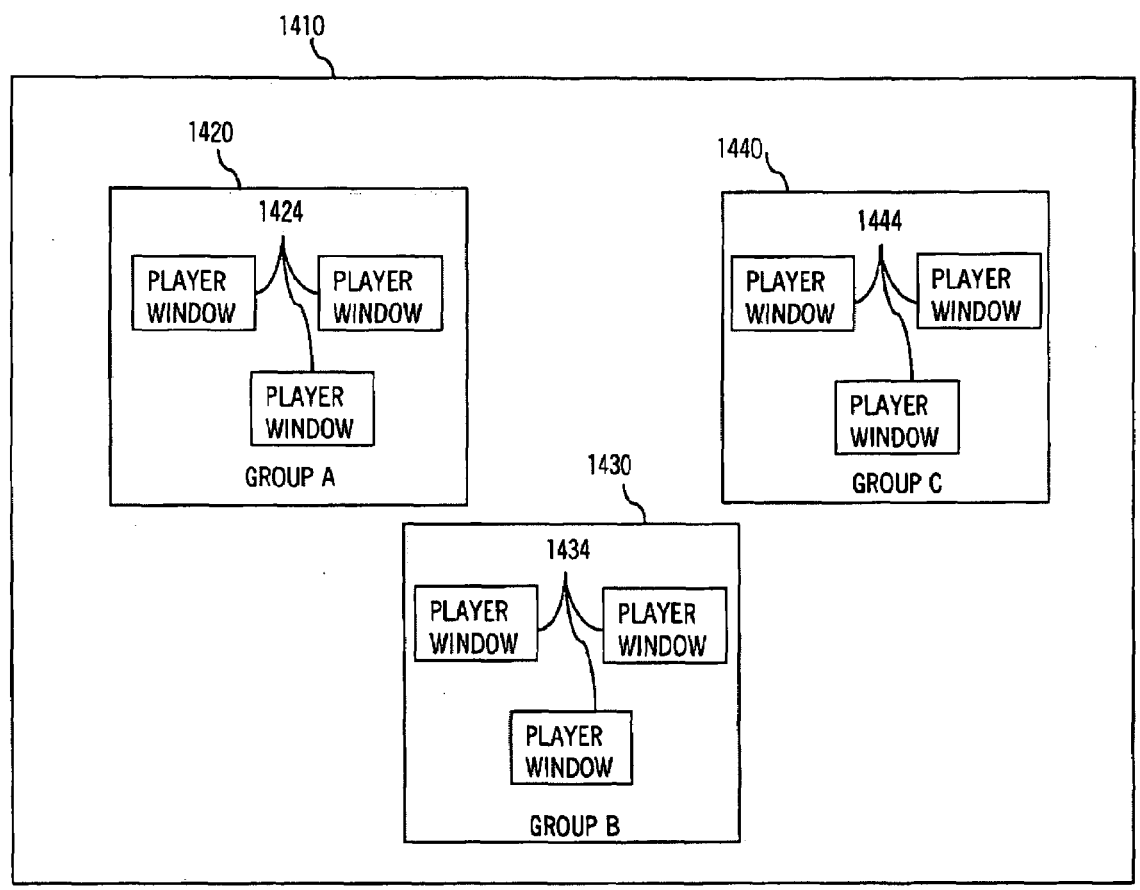

FIGS. 13 and 14 illustrate a pair of screenshots 1310 and 1410 that may be provided by the statistics gathering tool of the system 1200. In the screenshot 1310, the monitor screen is divided into two areas with one displaying player statistics in player windows/boxes 1320 and the other portion 1350 being used to display aggregated playtest statistics. For example, a player window 1320 may be provided for each member of the control group or each tester. In this embodiment, a thumbnail of the game playing status or game screen shot 1322 is provided that shows where the player is in the game (e.g., with a still shot that is periodically updated or the like), but the game position/status may be provided also with text, symbols, and other displayed information. The player window 1320 also includes a player data section 1330 that provides the developer or playtest monitor with information about the game player or tester. For example, but not as a limitation, the player data 1330 may include a player ID 1332 for each player along with a game/client address 1336 such as would allow the test monitor to transmit test mod messages to specific ones of the testers to test a game change. The player data 1330 may also include demographic information 1334 such as age, sex, and the like and, if the players/testers are grouped as part of the testing (or by the statistics gathering tool), the demographics or player ID may include information indicating which group or subset of the game testers or control group the player has been assigned. Game status information 1340 may also be provided in the player data 1330 such as their current score 1342, the amount of life or energy 1344 their character has in the game, and other statistics such as position in the game.

The testing described herein preferably includes some level of processing or aggregating of the game data from the testers to facilitate game development and decisions on how to improve the current game version. To this end, the aggregation section 1350 includes a title 1352 indicating which game is described and includes a number of aggregated statistics or game test results determined by processing and/or aggregating the collected test data. For example, the statistics 1350 may include average scoring for a game or portion of game 1354, may include percentage of players that lose or die at particular locations or tasks of the game 1356, may include average damage or loss of energy/life at various points of games 1358 (e.g., how much energy does it require to reach a checkpoint or to perform a battle, and so on), and/or may include number of players passing/beating a level on a first (or other) attempt. Numerous other statistics or playtest results may be determined by the statistics gathering tool and displayed in an interface as shown with screenshot 1310. In some cases, the system is also used to capture spatial information that can be overlaid on top of an authoring environment to provide context (e.g., where do people die or fail often in a game or the like).

In alternate or additional screenshot 1410, the statistics gathering tool may be used to group the game players or testers into groups based on various criteria and to display these various groups (or the player windows 1320 and their aggregated statistics 1350). For example, the criteria used to form three groups 1420, 1430, 1440 may be age or skill levels or these variable combined with gender of the players such as when the game may be more targeted to particular ages (such as tweens) or to particular genders. As shown, within each grouping on the screen 1410, a set of player windows 1424, 1434, 1444 are provided to allow a test monitor to quickly determine the status of the various players or testers in each group. Though not shown, a statistics/aggregated results window/box such as shown at 1350 may be provided for each group 1420, 1430, 1440 to allow the test monitor to more rapidly compare the playing experience for each group (e.g., one group finds the game or a portion of the game easy or hard while another group may have a very different experience). The output or game test data displayed in the screenshots 1310, 1410 may be utilized by a game developer to select test or game modifications (via operation of a game development tool) to implement within the entire control group or just on the machines/platforms of particular groups, fractions of groups, or even individual players.

Figure 15:
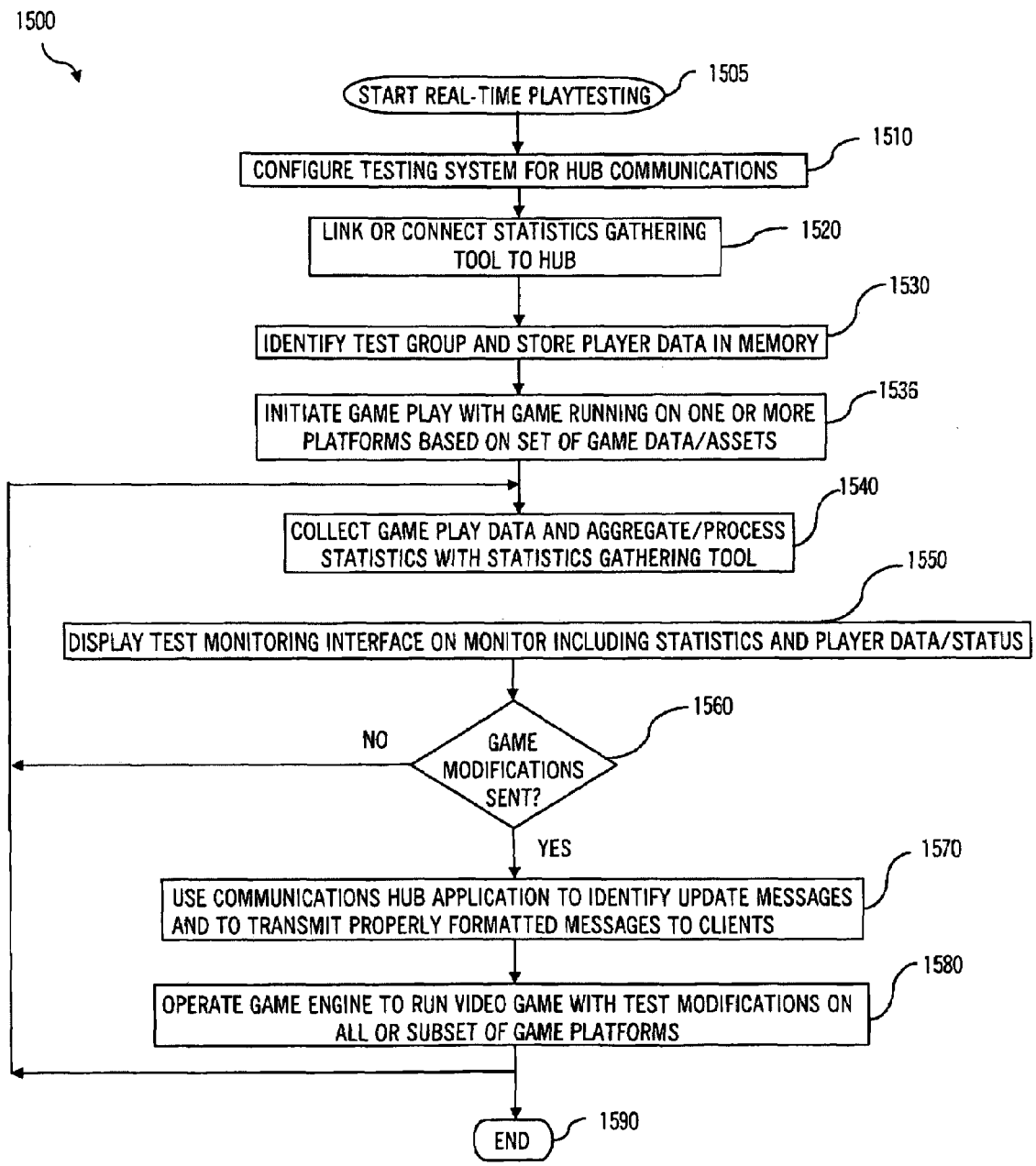
FIG. 15 is a flow chart showing the processes of an exemplary playtesting method providing real time feedback to developers or test monitors.

FIG. 15 illustrates a playtesting method 1500 that may be implemented by operation of the system 1200. The method 1500 starts at 1505 such as with selection of a video game for playtesting, establishing a testing protocol, identification of a control group or set of testers, and gathering demographic data on the testers. At 1510, the method 1500 includes configuring the testing system for hub communications such as by installing/loading a central hub application and communicatively linking this hub application with the game platforms in a test facility and game development tools to allow real-time game modifications during a test. At 1520, the method 1500 includes linking or connecting one or more statistics gathering tools to the hub application, and the statistics gathering tool may run on any computer device within the test system such as on the hub server or a developer workstation. At 1530, the method 1500 includes identifying a test group and storing player data in memory accessible by the statistics gathering tool.

At 1536, the method 1500 includes initiating game play in a test facility (or in platforms in a distributed test system which may even include online game testing as "facility" is not intended to be limiting to a particular physical location or room). In step 1536, a video game is run on a plurality of game platforms that may be the same configuration (e.g., all from one platform company) or may vary as the communications hub application allows the statistics gathering tool (and development tools) to communicate including receiving game play data from the various platforms and sending game data changes or authoring messages from the development tool to the running games. At 1540, the method 1500 includes collecting game play data as the games are played by the control group of testers or game players and also using the statistics gathering tool to store this data, to aggregate and/or process the data, and to determine various statistics or test parameters or values based on the game data.

At 1550, the statistics gathering tool provides a test monitoring interface on a monitor of a developer workstation or monitoring system, and the interface includes at least portions of the gathered game data such as calculated statistics and/or player data and status information (e.g., see FIGS. 13 and 14). At 1560, the developer may act to make game changes or modifications based on the displayed game data/statistics, e.g., operate a game development tool to change game logic, to change game assets, and/or so on. The method 1500 includes determining whether the modifications are made either automatically as discussed with an authoring tool or in response to an authoring message being sent by the development tool (e.g., manual message creation and transmission). At 1570, when a modification is made, the method 1500 continues with using the communications hub application to identify clients (e.g., games running on platforms in a test facility based on content and/or based upon addressees in the messages such as a subset of the games in the control group). The messages are transmitted in proper format for the various platforms. At 1580, the game engines are used to run video games with test modifications on all or a subset of the game platforms. The method 1500 may continue at 1540 to repeat gathering data after the game play data has been changed and tested by the control group. Additional changes may be made at 1560 in an iterative process (e.g., real-time game testing and updating/development). At 1590, the method 1500 ends such as at the end of the playtest session.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the playtesting methods described herein may be used with testing and developing other forms of software and other products in which feedback may be provided by computer software through a communications hub application to a monitoring system. In such product development environments, the testing information is gathered, processed, and displayed at least with some overlap with the testing session (e.g., while the testers are still available to test product modifications). A software development or authoring tool is used to transmit product modifications to the testing facilities (e.g., a set of computers or electronic devices running a software application) such as by sending authoring messages with content including such changes via the communication hub module or application. The modified product is tested with the implemented modifications by the same or nearly the same control group, and the results/data are sent to the statistics gathering tool for processing and/or display on the monitoring station. This iterative, real-time process is effective for more quickly fixing usability issues with software products and also for fine tuning product features and design aspects in response to tester feedback or tester experiences (as measured by collection of test data).

We claim:

1. A video game development system facilitating communications with at least first and second video game platforms based on at least first and second communication libraries, respectively, comprising:

a communications hub module running on a hub server communicatively linked with the first and second video game platforms;

memory accessible by the communications hub module storing the first and second communication libraries; and a video game development tool running on a computer system and communicatively linked with the communications hub module, the video game development tool transmitting messages configured based on a client-side communications library providing communication protocols for the communications hub module, wherein the communications hub module receives the transmitted messages, generates first and second game platform messages from the received messages based on the first and second communication libraries, respectively, and forwards the game platform messages to the first and second video game platforms, wherein the first game platform messages have differing format than the second game platform messages, wherein the messages transmitted by the video game development tool include game data for a video game running on the first and second video game platforms, wherein the game platform messages are forwarded to both the first and the second video game platforms, wherein the communications hub module processes each of the messages transmitted by the video game development tool to determine a list of recipients for each of the game platform messages, wherein the list of recipients is determined based on a set of addressees provided in the messages transmitted by the video game development tool, wherein the video game development system further includes a second video came development tool linked with the communications hub module, and wherein the second video game development tool is specified in the set of addressees or is placed on the list of recipients based on the came data in the transmitted messages.

2. The system of claim 1, wherein the list of recipients is determined from a list of clients registered with the communications hub module to receive messages from video game development tools and wherein the registered clients include subsystems of games running upon the first and second video game platforms.

3. The system of claim 1, wherein the video game development tool uses a single communications socket to send the transmitted messages to both the first and second video game platforms via the communications hub module.

4. The system of claim 3, wherein the communications hub module provides a communication interface between the video game development tool and the first and second video game platforms including maintaining communication sockets to the first and second video game platforms and implementing protocols in the first and second communication libraries.

5. A communication method for a video game development system, comprising:

providing a communication hub application on a computer linked to a communications network;

with the communication hub application, receiving a message from a game development tool running on a developer workstation;

identifying message recipients for the received message in the video game development system;

processing the received message based on communications libraries corresponding to each of the identified message recipients to form a set of recipient-specific messages, whereby the recipient-specific messages are in two or more configurations associated with corresponding ones of the identified message recipients;

transmitting the recipient-specific messages from the computer running the communication hub application to the identified message recipients; and receiving a second message from a second game development tool running in the video game development system, wherein the messages received from the game development tool and the second game development tool have a single configuration defined by a set of hub application communications data, wherein the configurations of the received messages differ from at least one of the configurations of the recipient-specific messages, and wherein the second received message comprises a list of addressees including the game development tool running on the developer workstation.

6. The method of claim 5, wherein the message received from the game development tool has a configuration defined by a set of hub application communications data and wherein the configuration of the received message differs from at least one of the configurations of the recipient-specific messages.

7. The method of claim 5, wherein the set of hub application communications data is stored in memory on the developer workstation for access by the game development tool.

8. The method of claim 5, wherein the identifying of the message recipients comprises registering a set of clients including instances of a video game running on a set of video game platforms and further comprises determining from game data content in the received message a subset of the registered clients to identify as the message recipients.

9. The method of claim 8, wherein the set of clients includes subsystems of the video game instances affected by modifications to game data in the game data content in the received message.

* * * * *

UNITED STATES PATENT AND TRADEMARK OFFICE
CERTIFICATE OF CORRECTION

| | | |
|---|---|---|
| PATENT NO. | : 8,176,124 B2 | Page 1 of 1 |
| APPLICATION NO. | : 12/328619 | |
| DATED | : May 8, 2012 | |
| INVENTOR(S) | : Fraser Graham and Bryce Thomsen | |

It is certified that error appears in the above-identified patent and that said Letters Patent is hereby corrected as shown below:

Claim 1, line 52 "came" should be changed to --game--.

Claim 1, line 56 "came" should be changed to --game--.

Signed and Sealed this
Twenty-fourth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,176,124 B2  
APPLICATION NO. : 12/328619  
DATED : May 8, 2012  
INVENTOR(S) : Fraser Graham and Bryce Thomsen Page 1 of 1

It is certified that error appears in the above-identified patent and that said Letters Patent is hereby corrected as shown below:

Claim 1, Column 24, line 52 "came" should be changed to --game--.

Claim 1, Column 24, line 56 "came" should be changed to --game--.

This certificate supersedes the Certificate of Correction issued July 24, 2012.

Signed and Sealed this
Twenty-eighth Day of August, 2012

David J. Kappos
*Director of the United States Patent and Trademark Office*